US006173691B1

(12) United States Patent
Yanagihara

(10) Patent No.: US 6,173,691 B1
(45) Date of Patent: Jan. 16, 2001

(54) COMPRESSION-IGNITION TYPE ENGINE

(75) Inventor: Hiromichi Yanagihara, Gotemba (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/244,126

(22) Filed: Feb. 4, 1999

(30) Foreign Application Priority Data

Feb. 20, 1998 (JP) ................................. 10-039232

(51) Int. Cl.$^7$ ...................................................... F02B 3/10
(52) U.S. Cl. ........................................... 123/299; 123/435
(58) Field of Search ................................. 123/299, 435

(56) References Cited

U.S. PATENT DOCUMENTS

| | | | |
|---|---|---|---|
| 4,704,999 | * 11/1987 | Hashikawa et al. | 123/299 |
| 5,467,757 | 11/1995 | Yanagihara et al. | |
| 5,727,519 | * 3/1998 | Kawamura | 123/299 |
| 5,732,674 | * 3/1998 | Motoyama et al. | 123/299 |
| 5,865,153 | * 2/1999 | Matsumoto | 123/299 |

FOREIGN PATENT DOCUMENTS

| | | |
|---|---|---|
| 37 34 800 A1 | 5/1989 | (DE) . |
| 44 15 826 A1 | 11/1995 | (DE) . |
| 6-129296 | 5/1994 | (JP) . |
| 8-82219 | 3/1996 | (JP) . |
| 9-158810 | 6/1997 | (JP) . |
| 10-141124 | 5/1998 | (JP) . |

OTHER PUBLICATIONS

Yokota, Haruyuki et al., "A New Concept for Low Emission Diesel Combustion," Society of Automotive Engineers, Inc., 1997, pp. 109–119.

Nakagome, Keiichi et al., "Combustion and Emission Characteristics of Premixed Lean Diesel Combustion Engine," Society of Automotive Engineers, Ind., 1997, pp. 163–171.

Yanagihara, Hiromichi, "Simultaneous Reduction of NOx and Soot in Diesel Engines Using a New Mixture Preparation Method," Transactions of the Japan Society of Mechanical Engineers, Series B, vol. 63, 1997, pp. 368–373.

Yanagihara, Hiromichi, "Simultaneous Reduction of NOx and Soot in Diesel Engines Using a New Mixture Preparation Method," JSME, Series B, vol. 40, 1997, pp. 592–598.

Yanagihara, Hiromichi et al., "A Study of DI Diesel Combustion Under Uniform Higher–Dispersed Mixture Formation," JSAE Review, vol. 18, No. 3, 1997, pp. 247–254.

Rinolfi, Dr. R. Et al., "The Potentials of Third Generation Direct Injection Diesel Engines for Passenger Cars," Engine and Environment International Congress, Sep. 4 and 5, 1997, pp. 1–20.

* cited by examiner

Primary Examiner—Erick Solis
(74) Attorney, Agent, or Firm—Oliff & Berridge, PLC

(57) ABSTRACT

A compression-ignition type engine in which first fuel of an amount of not more than 30 percent of the maximum amount of fuel is injected in an injection timing region from about 90 degrees to about 20 degrees before top dead center of the compression stroke, then second fuel is injected at substantially top dead center of the compression stroke. When the intensity of engine vibration becomes larger, the first injection amount is made to be reduced.

19 Claims, 18 Drawing Sheets

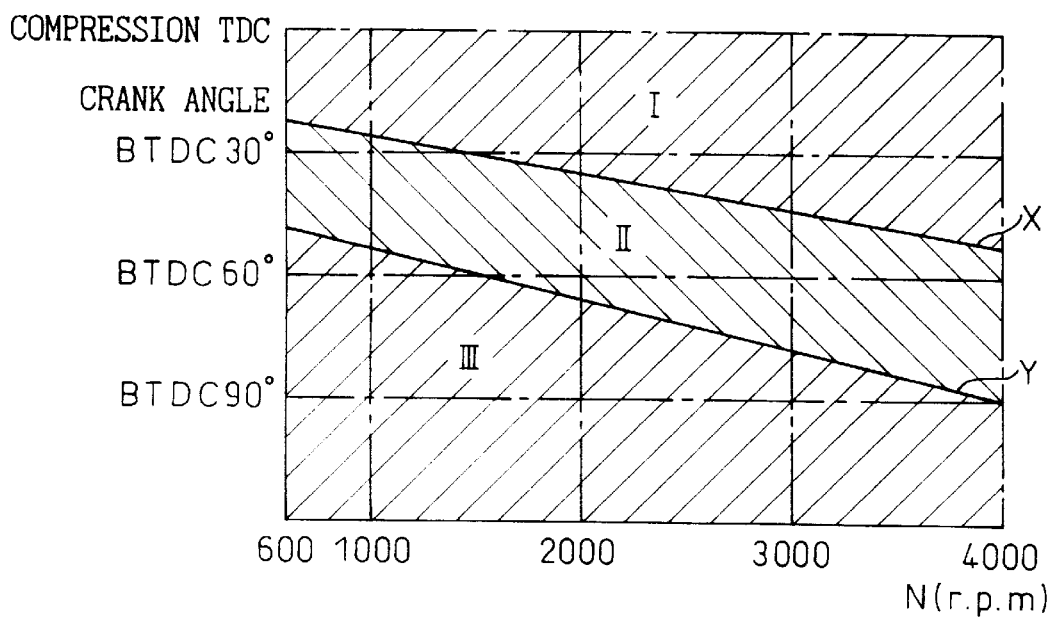
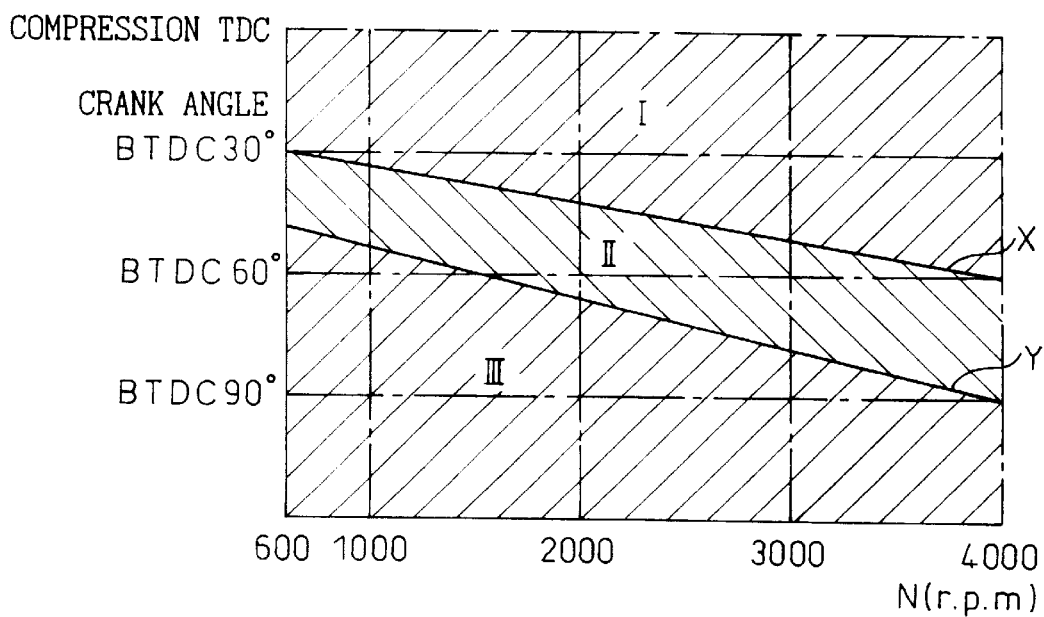

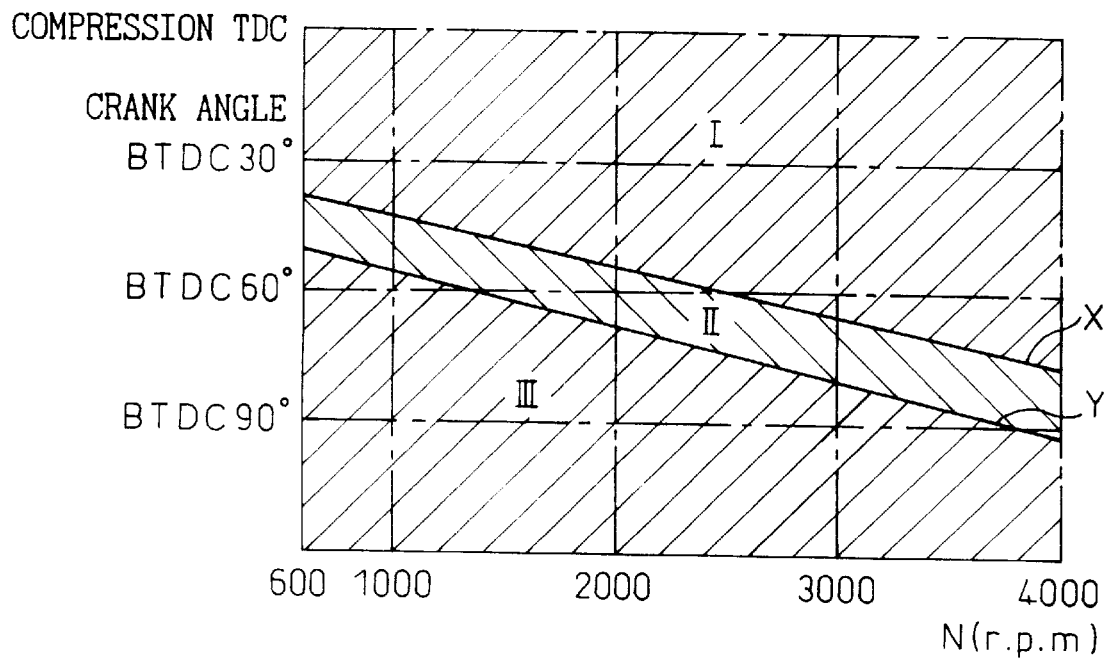
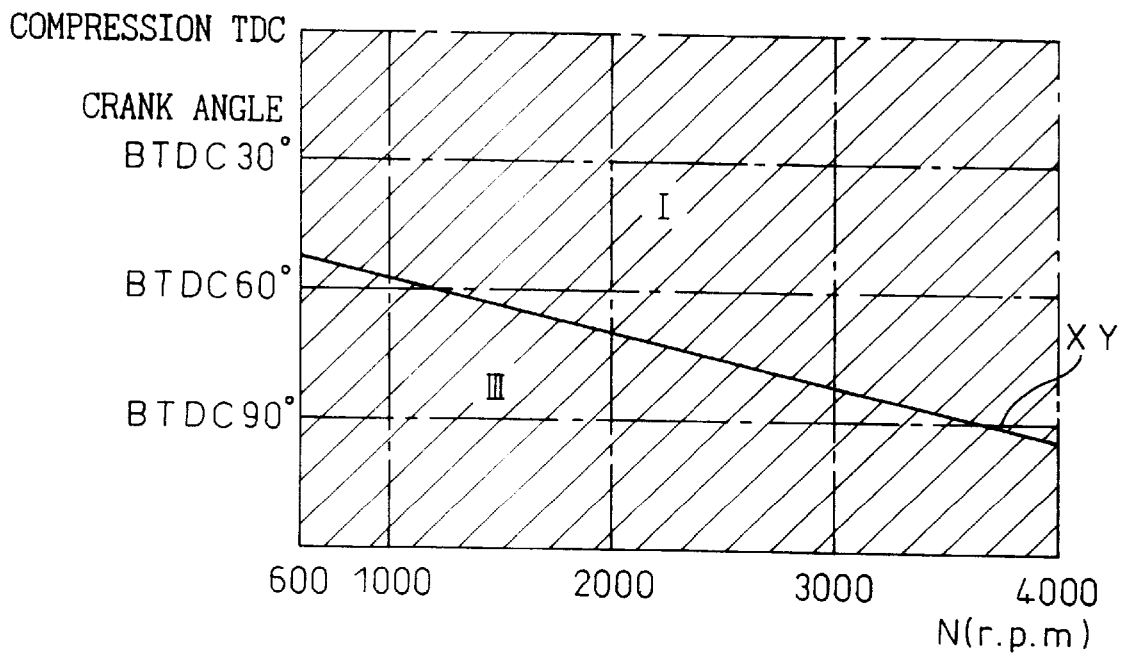

Fig.7A $L$ $Q_{11}$   $Q_{12}$   ----------   $Q_{1n}$ $Q_{21}$ $\vdots$                              $\vdots$ $Q_{m1}$   ----------------   $Q_{mn}$ $N$

Fig.7B $Q$ $Q1_{11}$   $Q1_{12}$   -------   $Q1_{1n}$ $Q1_{21}$ $\vdots$                              $\vdots$ $Q1_{m1}$   ----------------   $Q1_{mn}$ $N$

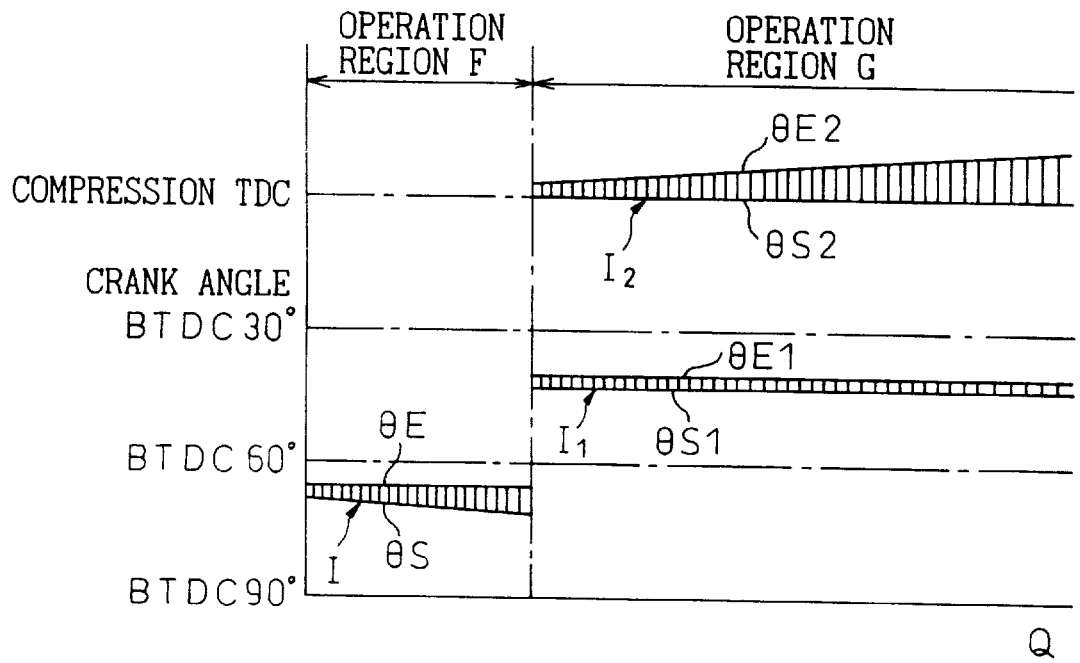
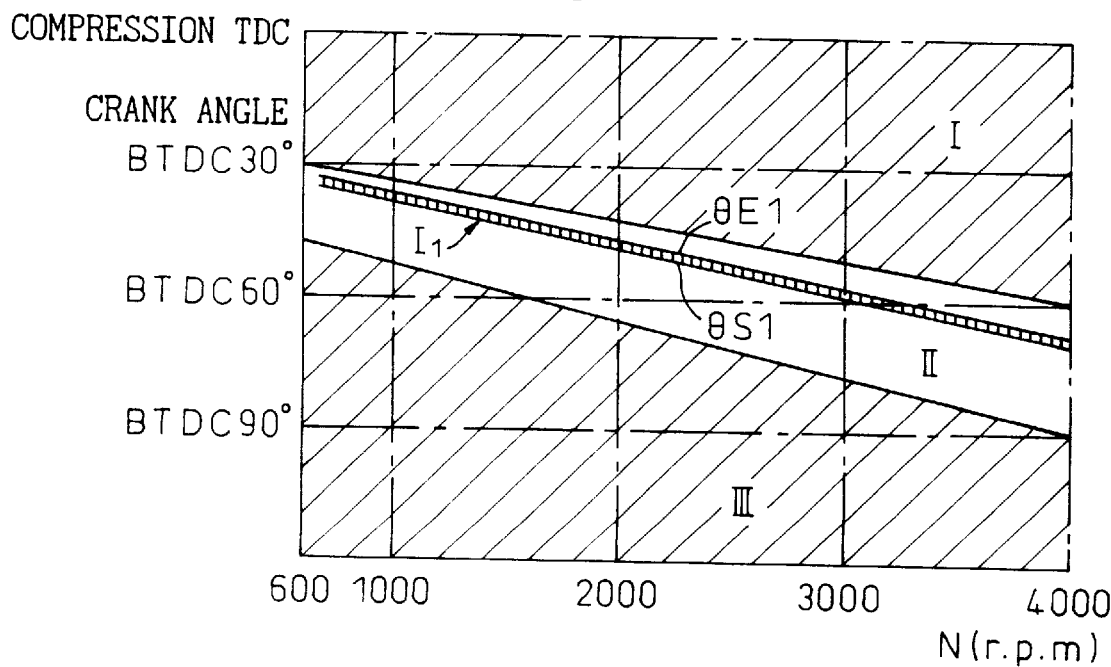

COMPRESSION-IGNITION TYPE ENGINE

BACKGROUND OF THE INVENTION

1. Field of the Invention

The present invention relates to a compression-ignition type engine.

2. Description of the Related Art

In a compression-ignition type engine, the degree of dispersion of the fuel injected into the combustion chamber has a major effect on the combustion. That is, if the fuel is made to disperse throughout the combustion chamber, the amount of heat generated per unit volume becomes lower, so the combustion temperature becomes lower and therefore smooth combustion is achieved without the generation of NOx. Further, since there is sufficient air present around the fuel particles, soot is no longer generated either. Therefore, known in the art is a compression-ignition type engine which is designed to inject fuel during the compression stroke before 60 degrees before top dead center so as to cause the injected fuel to disperse throughout the combustion chamber (see Japanese Unexamined Patent Publication (Kokai) No. 7-317588).

That is, if the pressure in the combustion chamber becomes high, the air resistance becomes larger, so the injected fuel has difficulty spreading throughout the entire combustion chamber. Therefore, this compression-ignition type engine was designed to inject the fuel before 60 degrees before top dead center in the compression stroke where the pressure in the combustion chamber is low.

Further, known in the art is a diesel engine designed to inject a large amount of fuel into the combustion chamber early on to form a lean air-fuel mixture and then to inject a small amount of fuel and cause the injected fuel to ignite when the engine is operating under a low load and to inject a small amount of fuel into the combustion chamber early on and then inject a large amount of fuel and cause the injected fuel to ignite when the engine is operating under a high load (Japanese Unexamined Patent Publication (Kokai) No. 8-82219).

When causing the injected fuel to disperse throughout the combustion chamber as in the compression-ignition type engine described in Japanese Unexamined Patent Publication (Kokai) No. 7-317588, gentle combustion is achieved without the generation of NOx and hydrocarbons if the amount of injected fuel is small. When the amount of fuel injected becomes larger, however, even if trying to cause the injected fuel to disperse throughout the combustion chamber, the fuel starts igniting early. Once the fuel ignites early, the temperature in the combustion chamber rises, so the fuel ignites even earlier. As a result, the combustion gradually becomes more intense and not only will knocking occur, but also large amounts of NOx and soot will be produced.

In this way, in a compression-ignition type engine, the ignition timing can no longer be controlled to the ignition timing giving a gentle combustion when the amount of injected fuel becomes large. If it were possible to control the ignition timing to the ignition timing giving gentle combustion in this case, then it would be possible to achieve gentle combustion with little generation of NOx and soot.

Further, the ignition timing is not controlled in the diesel engine described in Japanese Unexamined Patent Publication (Kokai) No. 8-82219 either.

SUMMARY OF THE INVENTION

An object of the present invention is to provide a compression-ignition type engine which is capable of controlling the ignition timing to an ignition timing giving a gentle combustion.

According to the present invention, there is provided a compression-ignition type engine comprising a combustion chamber; a fuel injector injecting fuel toward the combustion chamber; injecting means for injecting first fuel in a predetermined injection timing region of a latter half of a compression stroke and injecting second fuel at a timing later than the predetermined injection timing region; detecting means for detecting a reaction state of the first injected fuel; and control means for controlling at least one of an injection amount or injection timing of a first fuel injection or an injection amount or injection timing of a second fuel injection based on the result of detection of the detecting means so that the first injected fuel does not burn before the second fuel injection.

BRIEF DESCRIPTION OF THE DRAWINGS

The present invention may be more fully understood from the description of the preferred embodiments of the invention set forth below together with the accompanying drawings, in which:

FIGS. 2A and 2B and FIGS. 3A and 3B are view of different injection timing regions;

FIGS. 7A and 7B are maps of the total amount of fuel injection Q etc.;

FIGS. 19A and 19B are views of injection timings; and

DESCRIPTION OF THE PREFERRED EMBODIMENTS

Figure 1:
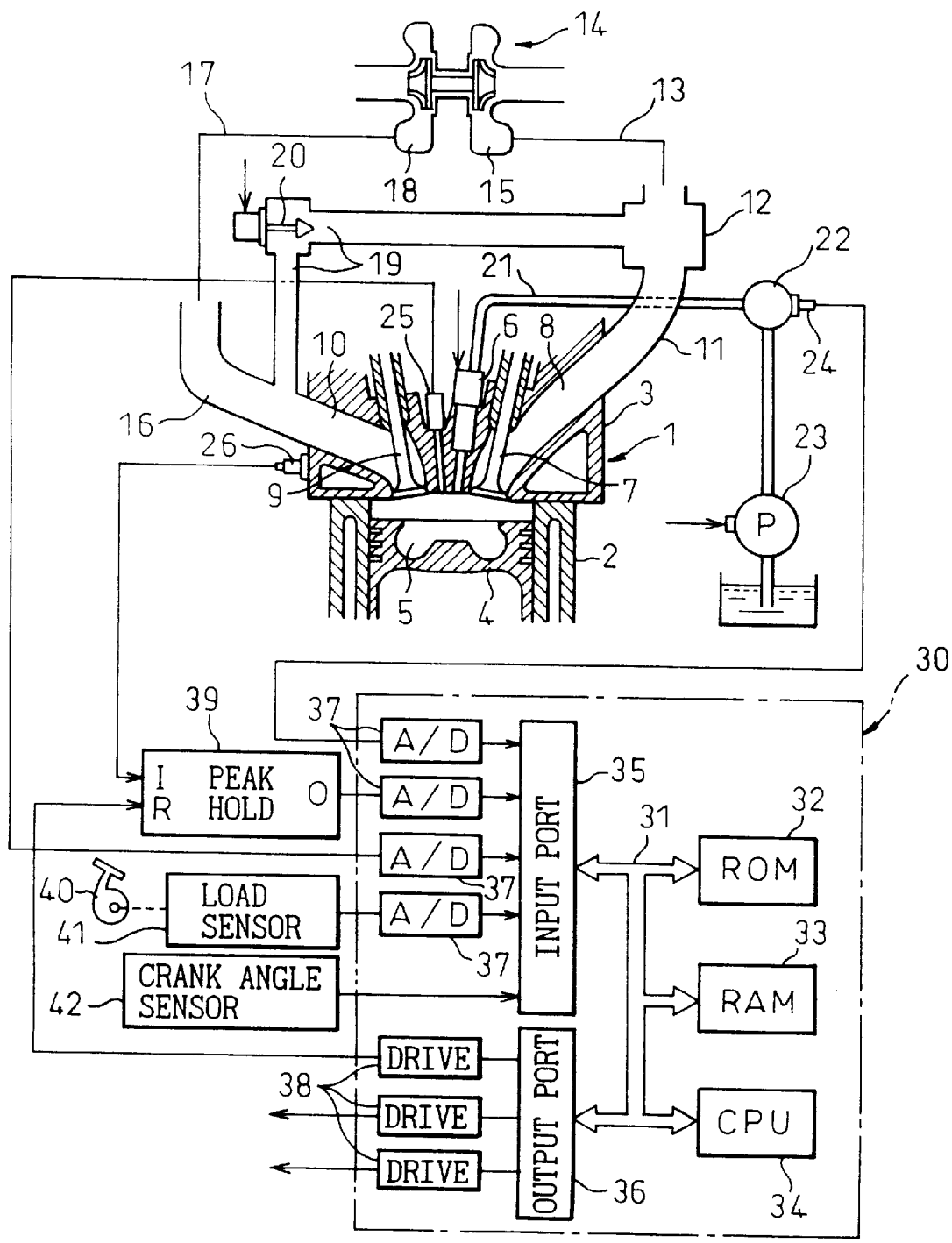
FIG. 1 is an overall view of a compression-ignition type engine.

Referring to FIG. 1, 1 designates an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected through a corresponding intake tube 11 to a surge tank 12. The surge tank 12 is connected to a compressor 15 of an exhaust turbocharger 14 through an intake duct 13. On the other hand, the exhaust port 10 is connected through an exhaust manifold 16 and exhaust pipe 17 to an exhaust turbine 18 of an exhaust turbocharger 14.

The exhaust manifold 16 and surge tank 12 are connected with each other through an exhaust gas recirculation (hereinafter referred to as "EGR") passage 19. In the EGR passage 19 is disposed an electrically controlled EGR control valve 20. The fuel injectors 6 are connected through fuel supply pipes 21 to a fuel reservoir, that is, a so-called common rail 22. The common rail 22 is supplied with fuel from an electrically controlled variable discharge fuel pump 23. The fuel supplied in the common rail 22 is supplied through the fuel supply pipes 21 to the fuel injectors 6. The common rail 22 is provided with a fuel pressure sensor 24 for detecting the fuel pressure in the common rail 22. The output signal of the fuel pressure sensor 24 is used to control the discharge of the fuel pump 23 so that the fuel pressure in the common rail 22 becomes the target fuel pressure.

An electronic control unit 30 is comprised of a digital computer and is provided with a read only memory (ROM) 32, random access memory (RAM) 33, microprocessor (CPU) 34, input port 35, and output port 36 connected to each other through a bidirectional bus 31. The output signal of the fuel pressure sensor 24 is input through a corresponding AD converter 37 to the input port 35. In the combustion chamber 5 is disposed a combustion pressure sensor 25 for detecting the pressure in the combustion chamber 25. The output signal of the combustion pressure sensor 25 is input through a corresponding AD converter 37 to the input port 35. Further, the engine body 1 is provided with a knocking sensor 26 for detecting the intensity of the vibration of the engine. The output signal of the knocking sensor 26 is connected to an input terminal I of a peak hold circuit 39. An output terminal O of the peak hold circuit 39 is input through a corresponding AD converter 37 to the input port 35.

An accelerator pedal 40 has connected to it a load sensor 41 for generating an output voltage proportional to the amount of depression L of the accelerator pedal 40. The output voltage of the load sensor 41 is input through a corresponding AD converter 37 to the input port 35. Further, the input port 35 has connected to it a crank angle sensor 42 which generates an output pulse with each for example 30 degree revolution of the crankshaft. On the other hand, the output port 36 is connected through a corresponding drive circuit 38 to the fuel injectors 6, EGR control valve 20, fuel pump 23, and reset input terminal R of the peak hold circuit 39.

In the embodiment shown in FIG. 1, to get the injected fuel to be dispersed as uniformly as possible in the combustion chamber 5, the fuel injector 6 is comprised of a hole nozzle having a large number of nozzle openings. When using such a fuel injector 6 to make the injected fuel disperse in the combustion chamber 5, it was learned that depending on the amount of injection and the injection timing, there were cases where the injected fuel would burn and cases where the injected fuel would not burn. Therefore, first, this will be explained with reference to FIGS. 2A and 2B and FIGS. 3A and 3B.

In FIGS. 2A and 2B and FIGS. 3A and 3B, the ordinate indicates the crank angle, while the abscissa indicates the engine speed N. Further, FIG. 2A shows the case of injection of fuel in an amount of 5 percent of the maximum amount of injection, FIG. 2B shows the case of injection of fuel in an amount of 10 percent of the maximum amount of injection, FIG. 3A shows the case of injection of fuel in an amount of 20 percent of the maximum amount of injection, and FIG. 3B shows the case of injection of fuel in an amount of over 30 percent of the maximum amount of injection.

Further, in FIGS. 2A and 2B and FIGS. 3A and 3B, I indicates an injection timing region where normal combustion occurs as in the past when fuel is injected at an injection timing in the region, II shows an injection timing region where no combustion occurs when fuel is injected at an injection timing in the region, and III shows an injection timing region where almost no NOx or soot is generated when fuel is injected at an injection timing in the region.

Whether or not the injected fuel burns depends on the density of the fuel particles and the temperature of the fuel particles. Simply speaking, when the density of the fuel particles is relatively low, combustion occurs if the temperature of the fuel particles is high and does not occur if the temperature of the fuel particles is low. As opposed to this, when the density of the fuel particles is high, combustion occurs regardless of the temperature of the fuel particles.

In this way, combustion occurs regardless of the temperature of the fuel particles if the density of the fuel particles is high, but the combustion at that time is explosive and generates a large amount of NOx and a large amount of soot. That is, the injected fuel undergoes a chemical reaction when the temperature in the combustion chamber 5 is more than 700° K. Before about 30 degrees BTDC, the temperature in the combustion chamber 5 is less than 700° K, therefore if the fuel is injected before 30 degrees BTDC, the injected fuel disperses in the combustion chamber 5 without undergoing a chemical reaction. Next, when the piston 4 rises and the temperature in the combustion chamber 5 becomes higher than a certain temperature, the evaporated fuel around the fuel particles bonds with oxygen. Explaining this in more detail, the terminal carbons of the straight chain hydrocarbons are attacked by the oxygen radicals resulting in the formation of aldehyde groups at the terminals of the straight chain hydrocarbons, then the aldehyde groups become hydroxy groups.

If the fuel particles become close together at this time, that is, when the density of the fuel particles is high, the fuel particles receive the heat of oxidation reaction of the evaporated fuel of the surrounding fuel particles and become high in temperature. As a result, the hydrocarbons in the fuel particles are broken down into hydrogen molecules $H_2$ and carbon C. The hydrogen molecules $H_2$ produced by this thermal decomposition explosively burn and generate a high temperature, therefore NOx is produced. On the other hand, when carbon C is produced by the thermal decomposition, the carbon atoms bond with each other and part is discharged as soot. In this way, when the density of the fuel particles is high, even if the fuel particles can be dispersed in the combustion chamber 5 without undergoing a chemical reaction, NOx and soot are produced due to the thermal decomposition of the hydrocarbons in the fuel particles.

On the other hand, if the fuel is injected after about 30 degrees BTDC, the injected fuel immediately undergoes a chemical reaction and the hydrocarbons in the fuel particles are decomposed by the heat. As a result, NOx and soot are produced. That is, when the density of the fuel particles is high, in other words, when there is a large amount of fuel injected, NOx and soot are produced no matter when the fuel is injected.

As opposed to this, when the density of the fuel particles is low, the situation is completely different. Therefore, next, an explanation will be given of the combustion when the density of the fuel particles is low, that is, when the amount of fuel injection is less than 30 percent of the maximum amount of injection and the fuel particles are made to disperse, that is, the case where fuel is injected in the injection timing region III of FIGS. 2A and 2B and FIGS. 3A and 3B.

Figure 4:
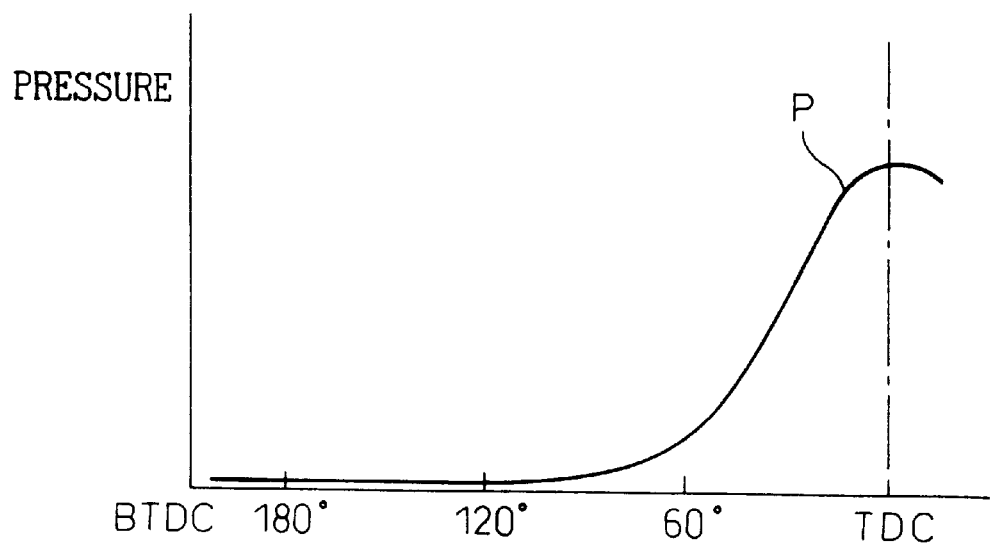
FIG. 4 is a view of the changes in pressure in the combustion chamber.

The curve of FIG. 4 shows the change in the pressure P in the combustion chamber 5 due to just the compression action of the piston 4. As will be understood from FIG. 4, the pressure P in the combustion chamber 5 rises rapidly when about 60 degrees BTDC is exceeded. This is regardless of the timing of opening of the intake valve 7. The pressure P in the combustion chamber 5 changes as shown in FIG. 4 in all types of reciprocating internal combustion engines. If the pressure P in the combustion chamber 5 becomes high, the air resistance becomes great, so the injected fuel will not disperse over a wide range. To get the injected fuel to disperse over a wide range, it is necessary to inject the fuel when the pressure P in the combustion chamber 5 is low.

As shown in FIGS. 2A and 2B and FIGS. 3A and 3B, the injection timing region III is about 50 degrees BTDC. Therefore, if fuel is injected in the injection timing region III, the fuel particles disperse over a wide range. Further, since the amount of fuel injected is less than 30 percent of the maximum amount of injection, the density of the fuel particles in the combustion chamber becomes considerably low.

If the density of the fuel particles is low in this way, the space between fuel particles becomes larger. Therefore, when the evaporated fuel around the fuel particles bonds with oxygen, the fuel particles do not receive much of the heat of oxidation of the evaporated fuel of the surrounding fuel particles and therefore the fuel particles do not decompose under heat. As a result, almost no hydrogen molecules $H_2$ or carbon C are produced. Next, when the compression stroke continues and the temperature of the fuel particles becomes higher, the evaporated fuel of the fuel particles substantially simultaneously start to burn.

If the evaporated fuel of the fuel particles substantially simultaneously start to burn in this way, there will not be any local high temperatures. Further, since the fuel particles are dispersed, the amount of heat generated per unit volume falls. As a result, the combustion temperature falls as a whole and therefore gentle combustion without generation of NOx is obtained. Further, since there is sufficient air present around the fuel particles, soot is no longer produced either.

As explained above, FIGS. 2A and 2B and FIG. 3A show cases where the amounts of fuel injected are 5 percent, 10 percent, and 20 percent of the maximum amount of fuel injection. If fuel is injected in the injection timing region III at this time, gentle combustion without generation of NOx or soot is obtained. Further, FIG. 3B shows the case where the amount of fuel injected is over 30 percent of the maximum amount of fuel injection. If fuel is injected in the injection timing region III, gentle combustion without generation of NOx and soot can be obtained up to an amount of fuel injection of about 50 percent of the maximum amount of injection. When the amount of fuel injected exceeds about 50 percent of the maximum amount of injection, the density of the fuel particles is high even if the fuel particles are dispersed, so NOx and soot are produced.

Therefore, when the amount of fuel injected is less than about 50 percent of the maximum amount of injection, gentle combustion without generation of NOx and soot can be obtained if the fuel is injected in the injection timing region III.

As shown in FIGS. 2A and 2B and FIGS. 3A and 3B, the latest injection timing of the injection timing region III, that is, in FIGS. 2A and 2B and FIG. 3A, the boundary Y between the injection timing region III and the injection timing region II and, in FIG. 3B, the boundary XY between the injection timing period III and the injection timing period I, is substantially the same regardless of the amount of injection. That is, the boundaries Y and XY are near 50 degrees BTDC when the engine speed N is 600 rpm. The higher the engine speed N becomes, the more they shift to bottom dead center of the compression stroke. When the engine speed N is 4000 rpm, they become about 90 degrees BTDC. That is, it takes time for the injected fuel to disperse, therefore to get the injected fuel to disperse, that is, to make the density of the fuel particles low, it is necessary to make the injection timing earlier the higher the engine speed N. Further, the higher the engine speed N, the shorter the time for heating the fuel particles, therefore in order to give the fuel particles sufficient heat required for the fuel particles to ignite, it is necessary to make the injection timing earlier the higher the engine speed N. Therefore, as shown in FIGS. 2A and 2B and FIGS. 3A and 3B, the boundaries Y and XY shift toward the bottom dead center of the compression stroke as the engine speed N rises.

Note that the boundaries Y and XY do not in practice appear as clearly as shown in FIGS. 2A, 2B, 3A, and 3B, therefore the boundaries Y and XY express the approximate timings of the latest injection timing in the injection timing region III.

Next, an explanation will be given of the injection timing region II. As explained earlier, no combustion occurs if fuel of less than about 30 percent of the maximum amount of injection is injected in the injection timing region II.

That is, as explained above, before about 30 degrees BTDC, the temperature in the combustion chamber 5 is less than 700° K, therefore if fuel is injected in the injection timing region II, no chemical reaction occurs. Further, since the pressure P in the combustion chamber 5 is higher in the injection timing region II than the injection timing region III, the degree of dispersion of the fuel particles is lower than in the injection timing region III. Since the amount of fuel injected is less than 30 percent of the maximum amount of injection, however, the density of the fuel particles is relatively small even if the degree of dispersion of the fuel particles falls somewhat. If the density of the fuel particles is low in this way, the space between fuel particles becomes greater and therefore, as explained above, the fuel particles do not receive much of the heat of oxidation of the evaporated fuel of the surrounding fuel particles and so do not decompose under heat. Therefore, no explosive combustion occurs.

On the other hand, as mentioned above, if the evaporated fuel of the fuel particles undergoes an oxidation reaction, hydroxy groups are produced at the terminals of the straight chain hydrocarbons. When the piston 4 next rises, the amount of the straight chain hydrocarbons with hydroxy groups, that is, the amount of oxygen-containing easily burnable hydrocarbons, increases. The injection timing region II is however later in injection timing than the injection timing region III, therefore the temperature of the fuel particles injected in the injection timing region II does not rise to the extent of ignition. Therefore, combustion does not start even if the amount of oxygen-containing easily burnable hydrocarbons increases.

Next, the top dead center of the compression stroke is reached in this state, that is, in the state with an increase in the amount of oxygen-containing easily burnable hydrocarbons without combustion. If nothing is then done, the fuel will not ignite resulting in a misfire.

As shown in FIGS. 2A and 2B and FIG. 3A, the latest injection timing in the injection timing region II, that is, the boundary X between the injection timing region II and the injection timing region I, is substantially parallel to the boundary Y. That is, the width of the injection timing region II, in other words, the width between the boundary X and the boundary Y, becomes substantially constant regardless of the engine speed N. Further, as shown in FIGS. 2A and 2B and FIG. 3A, the width between the boundary X and the boundary Y becomes smaller the larger the ratio of the amount of injection to the maximum amount of injection. As shown in FIG. 3B, when the amount of injection becomes more than 30 percent of the maximum amount of injection, the injection timing region II disappears.

That is, when the amount of injection is 5 percent of the maximum amount of injection, as shown in FIG. 2A, the boundary X when the engine speed N is 600 rpm is about 20 degrees BTDC and the width between the boundary X and the boundary Y increases from about 30 degrees crank angle to about 40 degrees crank angle. When the amount of injection is 10 percent of the maximum amount of injection, as shown in FIG. 2B, the boundary X when the engine speed N is 600 rpm is about 30 degrees BTDC and the width between the boundary X and the boundary Y increases from about 20 degrees crank angle to about 30 degrees crank angle. When the amount of injection is 20 percent of the maximum amount of injection, as shown in FIG. 3A, the boundary X when the engine speed N is 600 rpm is about 40 degrees BTDC and the width between the boundary X and the boundary Y increases from about 10 degrees crank angle to about 15 degrees crank angle. When the amount of injection is over 30 percent of the maximum amount of injection, as shown in FIG. 3B, the injection timing region II disappears.

If the amount of fuel injection is increased, the density of the fuel particles becomes greater, therefore when the amount of fuel injection is increased, the degree of dispersion of the fuel particles has to be increased or else combustion will occur. The degree of dispersion of fuel particles becomes higher the earlier the injection timing, therefore the width of the injection timing region II becomes smaller the larger the amount of injection.

Further, the injection timing region II shifts to the low load side the higher the engine speed N. That is, as explained above, it takes time for the injected fuel to disperse. If the injection timing is not made earlier the higher the engine speed N, the degree of dispersion of the fuel particles will not become smaller. Therefore, the injection timing region II shifts to the low load side the higher the engine speed N.

Note that the boundary X is expressed relatively clearer than the boundaries Y and XY.

On the other hand, if fuel is injected in the injection timing region I, normal combustion as in the past occurs. That is, in the injection timing region I, since the pressure P in the combustion chamber 5 (FIG. 4) is high and therefore the injected fuel does not sufficiently disperse, the density of the fuel particles becomes higher. As a result, the fuel particles decompose by the heat causing explosive combustion and the generation of large amounts of NOx and soot.

As explained above, when the amount of fuel injection is less than 30 percent of the maximum amount of injection, no combustion will occur when fuel is injected in the injection timing region II. As opposed to this, when the amount of fuel injection becomes more than 30 percent of the maximum amount of injection, the injected fuel will burn no matter what the injection timing region. In this case, as shown in FIG. 3B, there are only the injection timing regions I and III.

If the injected fuel is made to disperse in this way, when the amount of fuel injection is less than 30 percent of the maximum amount of injection, the injection timing region can be divided into the injection timing region I where explosive combustion occurs, the injection timing region III where gentle combustion occurs without the generation of NOx and soot, and the injection timing region II where no combustion occurs between the injection timing regions I and III. On the other hand, when the amount of fuel injection is over 30 percent of the maximum amount of injection and less than about 50 percent, the injection timing region can be divided into the injection timing region I and the injection timing region III. When the amount of fuel injection is more than about 50 percent, normal combustion occurs as in the past over the entire injection timing region.

Note that the injection timing region II shown in FIGS. 2A and 2B and FIG. 3A is affected by the compression ratio and the EGR rate (=amount of EGR gas/(amount of intake air+amount of EGR gas)). That is, when the engine compression ratio becomes higher, in the injection timing region II shown in FIGS. 2A and 2B and FIG. 3A, the pressure in the combustion chamber 5 becomes higher, so the fuel particles become harder to disperse and the temperature of the gas in the combustion chamber 5 also rises. Accordingly, if fuel is injected in the injection timing region II shown in FIGS. 2A and 2B and FIG. 3A, the fuel particles decompose due to the heat and therefore ignite. Therefore, if the engine compression ratio rises, the injection timing region II where no combustion occurs disappears.

On the other hand, if the EGR rate is made larger, the density of the oxygen around the fuel particles becomes smaller and as a result the heat of oxidation of the evaporated fuel from the fuel particles becomes lower, so even if the degree of dispersion of the fuel particles becomes smaller to a certain extent, the fuel particles no longer decompose by the heat. Therefore, there is an injection timing region II where no combustion will occur even when the engine compression ratio is made a bit higher when the EGR rate is high.

Figure 5:
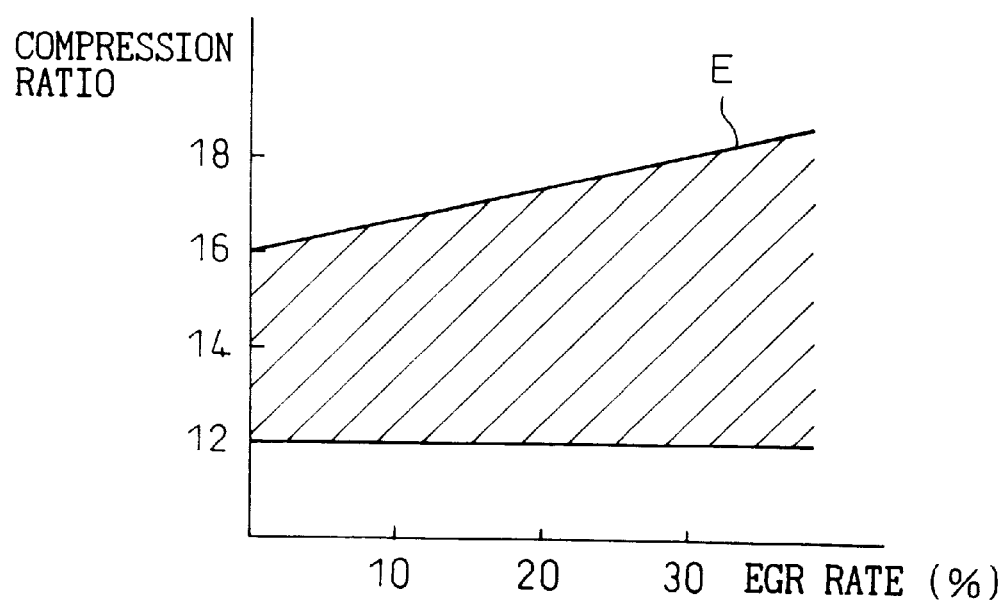
FIG. 5 is a view of the range of the compression ratio of an engine.

The solid line E in FIG. 5 shows the upper limit of the engine compression ratio in the injection timing region II where no combustion occurs as shown in FIGS. 2A and 2B and FIG. 3A. As shown in FIG. 5, when the EGR rate is zero, the upper limit E of the engine compression ratio in the injection timing region II where no combustion occurs is about 16.0. If the engine compression ratio becomes larger than about 16.0, there is no longer an injection timing region II where no combustion occurs.

On the other hand, the upper limit E of the engine compression ratio in the injection timing region II where no combustion occurs becomes higher the higher the EGR rate. Further, to cause compression ignition, the engine compression ratio must be made at least about 12.0. Therefore, the range of engine compression ratio in the injection timing region II where no combustion occurs becomes the range shown by the hatching in FIG. 5.

As explained earlier, if fuel is injected in an amount of less than 30 percent of the maximum amount of injection in the injection timing region II, a considerable amount of oxygen-containing easily burnable hydrocarbons are produced in the combustion chamber near top dead center of the compression stroke. No combustion occurs at this time, therefore if fuel is again injected at this time, the fuel particles are dispersed in the combustion chamber 5 without burning. When the fuel particles are dispersed and the temperature rises, the fuel particles decompose by heat at all locations. When the fuel particles decompose by heat, the hydrogen molecules $H_2$ produced burn and as a result the pressure in the combustion chamber 5 as a whole rises, so the temperature in the combustion chamber 5 as a whole rises.

When the temperature in the combustion chamber 5 as a whole rises, the oxygen-containing easily burnable hydrocarbons dispersed in the combustion chamber 5 as a whole simultaneously start to burn, whereby the fuel particles injected the second time can be burned. If combustion is started simultaneously throughout the combustion chamber 5 in this way, there is no local rise in the combustion temperature and the combustion temperature in the combustion chamber 5 becomes lower as a whole, so generation of NOx is suppressed. Further, since the fuel injected the second time can be burned after being dispersed, there is sufficient air present around the fuel particles and therefore the generation of soot is also suppressed.

Therefore, in the present invention, the first fuel injection of not more than 30 percent of the maximum amount of injection is performed in the injection timing region II, then the second fuel injection is performed at substantially the top dead center of the compression stroke or after top dead center of the compression stroke.

Note that in the past, compression-ignition type engines have been designed to inject a small amount of fuel before the main injection, that is, perform a pilot injection. This pilot injection is usually performed in the injection timing region I shown in FIGS. 2A and 2B and FIG. 3A. Therefore, the pilot fuel injected ignites on its own. As opposed to this, in the present invention, the fuel injected in the injection timing region II does not ignite on its own. Accordingly, the injection action in the injection timing region II and the conventional pilot injection action can be clearly differentiated from other each.

Figure 6A:
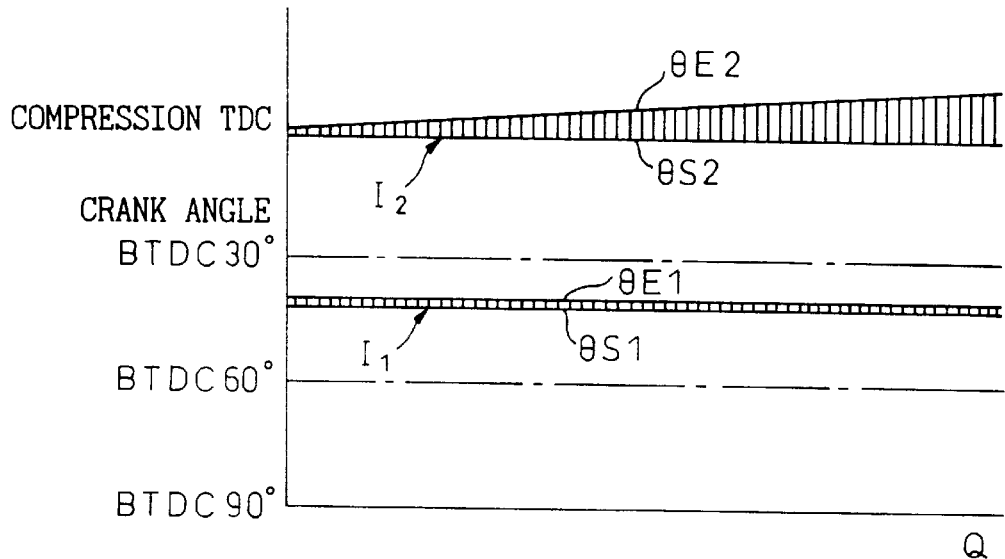
FIGS. 6A and 6B are views of the injection timing.
Figure 6B:
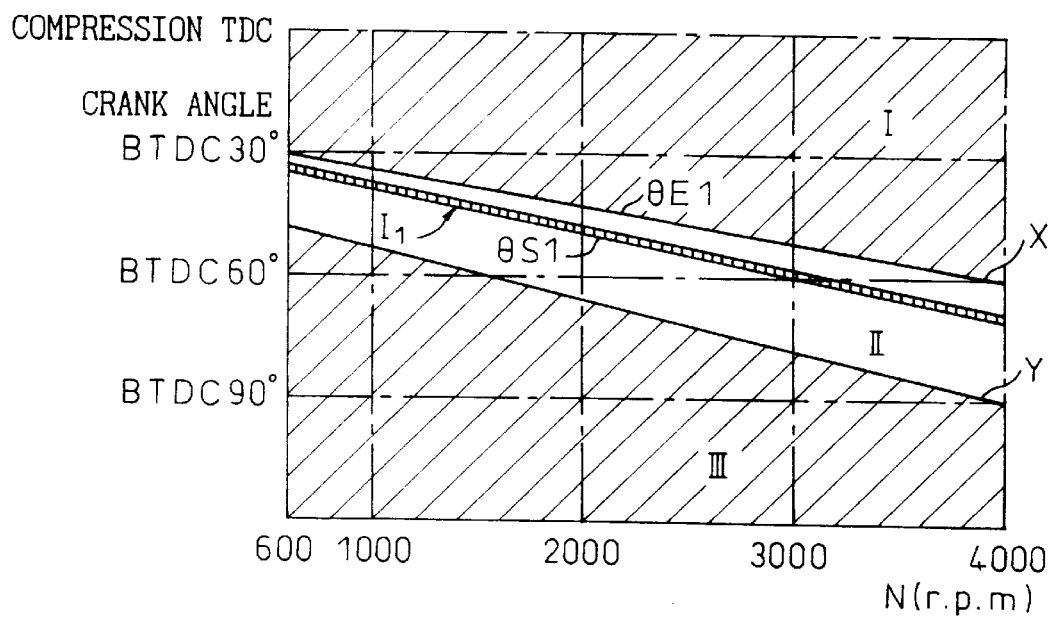

FIG. 6B shows the injection timing of the first fuel injection $I_1$, while FIG. 6A shows the injection timing of the first fuel injection $I_1$ and the second fuel injection $I_2$ at a specific engine speed N, for example, 1500 rpm. Note that the abscissa of FIG. 6A shows the total amount of fuel injection Q, while the ordinate N of FIG. 6B shows the engine speed.

Further, in FIGS. 6A and 6B, $\theta S1$ and $\theta E1$ show the injection start timing and the injection completion timing of the first fuel injection $I_1$, while $\theta S2$ and $\theta E2$ show the injection start timing and injection completion timing of the second fuel injection $I_2$. Further, FIGS. 6A and 6B show the case where the fuel pressure in the common rail 22 is maintained at a certain constant pressure. Therefore, in FIGS. 6A and 6B, the amount of fuel injection is proportional to the injection timing. As shown in FIG. 6B, the first fuel injection $I_1$ is performed at a timing close to the relative boundary X in the injection timing region II, therefore the timing of the first fuel injection $I_1$ is made earlier the higher the engine speed N.

In FIG. 6A, the total amount of fuel injection Q is a function of the amount of depression L of the accelerator pedal 40 and the engine speed N. The total amount of fuel injection Q is stored in advance in the ROM 32 in the form of the map shown in FIG. 7A. On the other hand, the injection amount Q1 of the first fuel injection $I_1$ is a function of the total amount of fuel injection Q and the engine speed N. The injection amount Q1 is also stored in advance in the ROM 32 in the form of the map shown in FIG. 7B. The injection amount Q1 stored in the map is from 10 percent to 20 percent of the maximum injection amount. Further, the injection start timing $\theta S1$ of the first fuel injection $I_1$ is also a function of the total amount of fuel injection Q and the engine speed N. The injection start timing $\theta S1$ is also stored in advance in the ROM 32 in the form of the map shown in FIG. 8A. Further, the injection start timing $\theta S2$ of the second fuel injection $I_2$ is also a function of the total amount of fuel injection Q and the engine speed N. The injection start timing $\theta S2$ is also stored in advance in the ROM 32 in the form of the map shown in FIG. 8B. The injection start timing $\theta S2$ stored in the map is near the top dead center of the compression stroke or after top dead center of the compression stroke.

Figure 9:
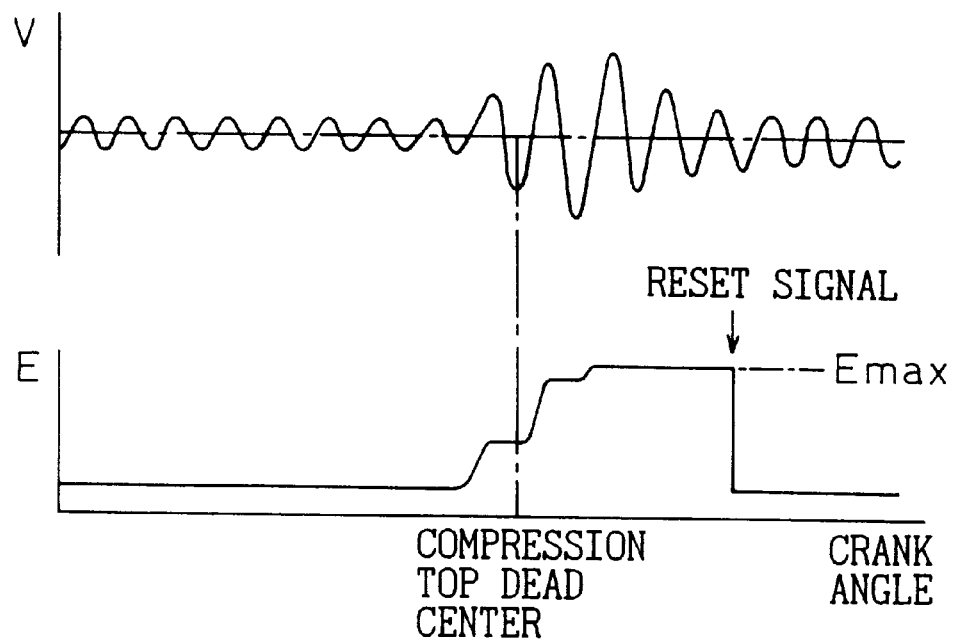
FIG. 9 is a view of an output voltage of a knocking sensor and an output voltage of a peak hold circuit.

FIG. 9 shows the output voltage of the knocking sensor 26 and the output voltage of the peak hold circuit 39. The peak hold circuit 39 is reset by a reset signal (FIG. 9) input from the output port 36 to the reset input terminal R of the peak hold circuit 39 at a predetermined crank angle after top dead center of the compression stroke. Once the peak hold circuit 39 is reset, the maximum voltage of the output voltage E of the knocking sensor 26 input to the input terminal I of the peak hold circuit 39 appears at the output terminal O of the peak hold circuit 39. In this embodiment of the present invention, the output voltage of the peak hold circuit 39 when this reset signal is generated is made the maximum value Emax of the output voltage of the knocking sensor 26 near the top dead center of the compression stroke.

Figure 10:
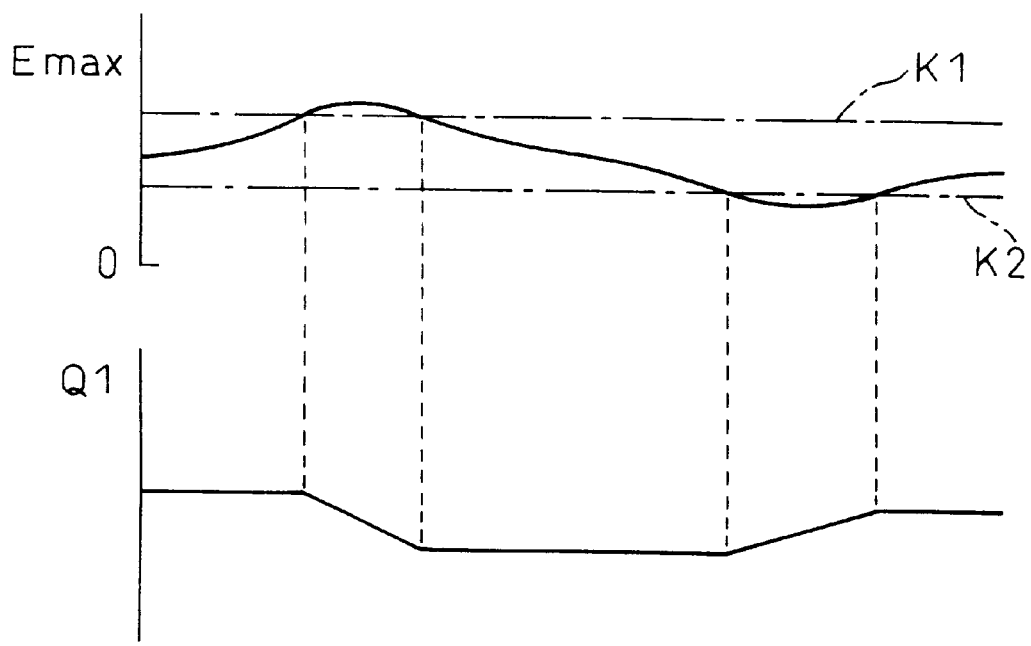
FIG. 10 is a view of changes in a maximum output voltage Emax of the knocking sensor and an injection amount Q1.

FIG. 10 shows a first embodiment in which the maximum output voltage Emax of the knocking sensor 26 is used to control the injection amount Q1 of the first fuel injection $I_1$. That is, if the fuel injection is controlled based on the injection amount Q1 and the injection start timings $\theta S1$ and $\theta S2$ stored in the maps shown in FIG. 7B and FIGS. 8A and 8B, after the normal second fuel injection $I_2$, the first injected fuel and the second injected fuel will be burned and therefore gentle combustion with little generation of NOx and soot will be obtained. If for some reason or another the first injected fuel starts to burn before the second fuel injection, explosive combustion will occur and therefore large amounts of NOx and soot will be produced. Further, if oxygen-containing easily burnable hydrocarbons are not sufficiently produced when the second fuel injection is being performed, the second injected fuel will explosively burn in the same way as in a conventional engine and therefore large amounts of NOx and soot will be produced.

As will be understood from FIGS. 2A and 2B and FIGS. 3A and 3B, however, if the first injection amount Q1 increases, explosive combustion will occur. In this case, in actuality, when the first injection amount Q1 increases, the engine vibration gradually becomes larger. When the first injection amount Q1 further increases and explosive combustion occurs, the engine vibration becomes extremely large. Therefore, in the first embodiment, explosive combustion is prevented from occurring by gradually reducing the first injection amount Q1 when the intensity of the vibration of the engine exceeds a predetermined intensity, that is, as shown in FIG. 10, when the maximum output voltage Emax of the knocking sensor 26 exceeds a predetermined upper limit K1.

On the other hand, when the first injection amount Q1 is reduced, the intensity of the engine vibration becomes lower, but when the intensity of the engine vibration becomes too low, the amount of production of the oxygen-containing easily burnable hydrocarbons will become insufficient and therefore there will be the danger of the second injected fuel burning explosively. Therefore, in the first embodiment, when the intensity of the vibration of the engine becomes lower than a predetermined intensity, that is, as shown in FIG. 10, when the maximum output voltage Emax of the knocking sensor 26 becomes lower than a lower limit K2, the first injection amount Q1 is gradually increased.

Figure 11:
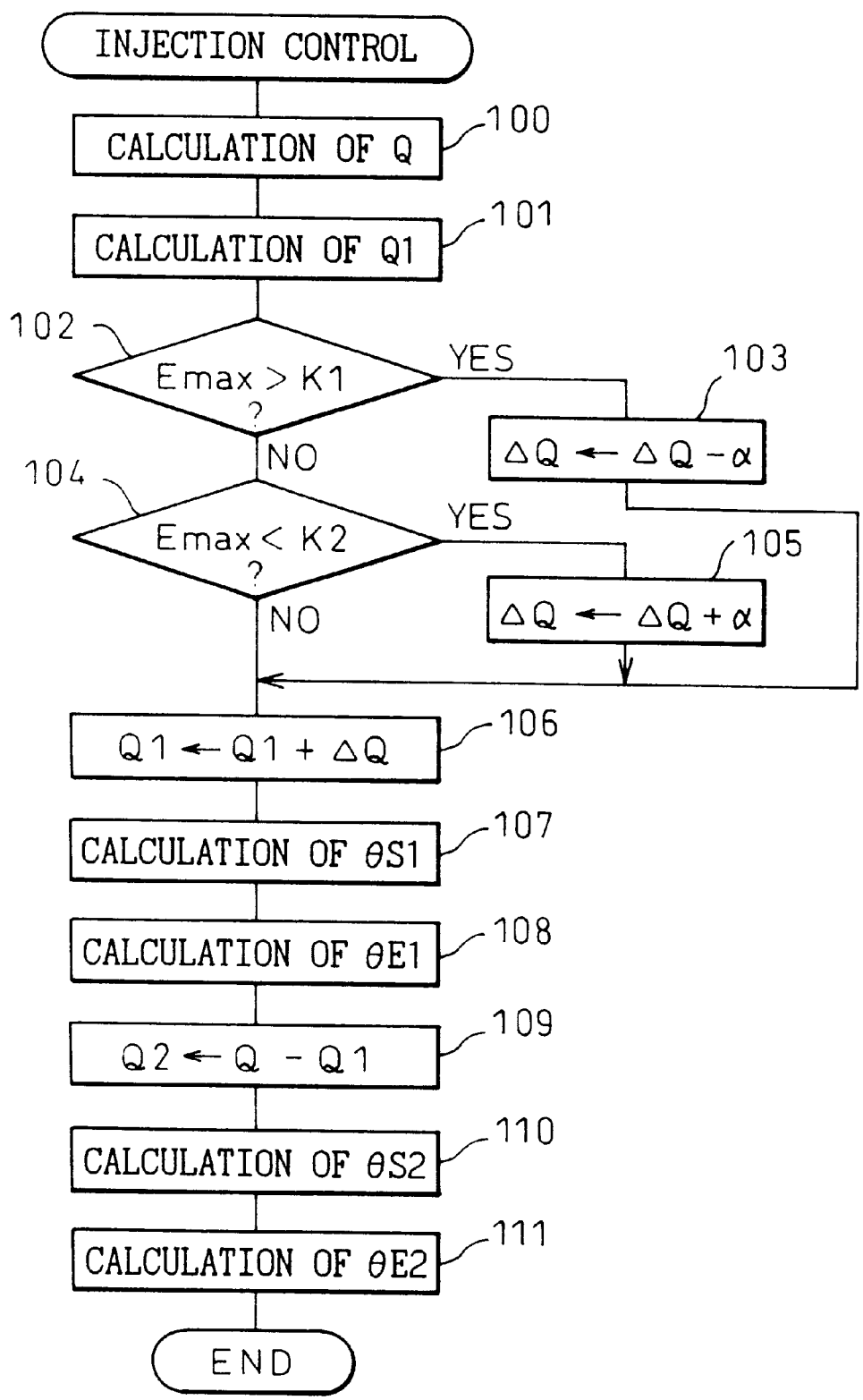
FIG. 11 is a flow chart of the control of injection for working a first embodiment.

FIG. 11 shows an injection control routine for working the first embodiment.

Referring to FIG. 11, first, at step 100, the total amount of fuel injection Q is calculated from the map shown in FIG. 7A. Next, at step 101, the injection amount Q1 of the first fuel injection $I_1$ is calculated from the map shown in FIG. 7B. Next, at step 102, it is judged if the maximum output voltage Emax of the knocking sensor 26 is larger than the upper limit K1 or not. When Emax>K1, the routine proceeds to step 103, where the correction value ΔQ of the injection amount Q1 is reduced by a predetermined value α, then the routine proceeds to step 106, when Emax≦K1, the routine proceeds to step 104, where it is judged if the maximum output voltage Emax of the knocking sensor 26 is lower than the lower limit K2 or not. When Emax<K2, the routine proceeds to step 105, where the correction value ΔQ is increased by the predetermined value α, then the routine proceeds to step 106.

At step 106, the correction value ΔQ is added to the injection amount Q1. Therefore, it will be understood that when Emax>K1, the injection amount Q1 is gradually reduced, while when Emax<K2, the injection amount Q1 is gradually increased.

Figure 8A:
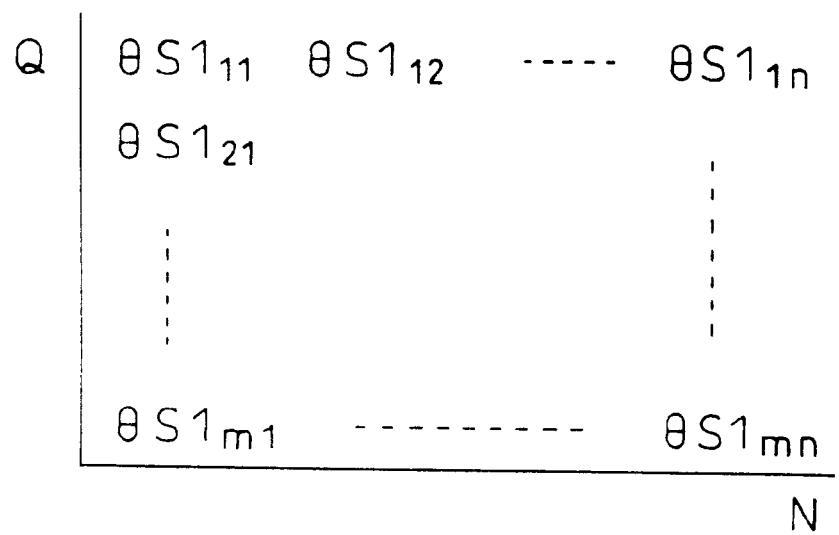
FIGS. 8A and 8B are maps of injection start timings $\theta S1$ and $\theta S2$.
Figure 8B:
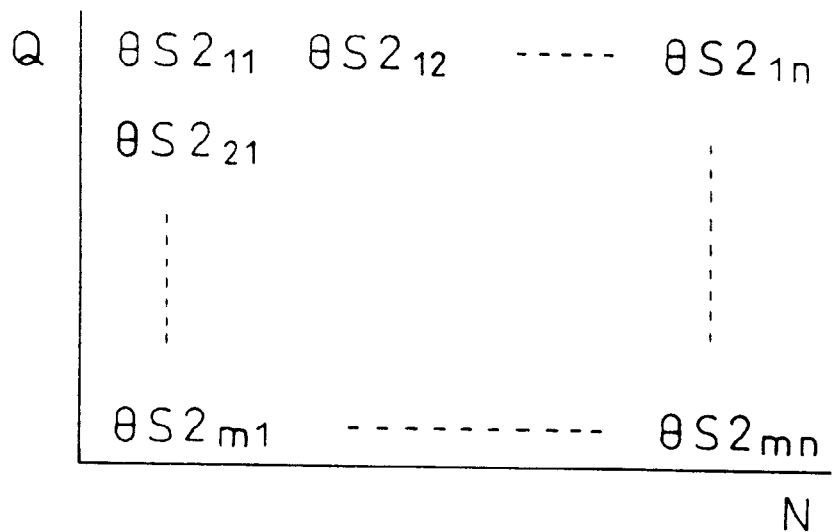

Next, at step 107, the injection start timing θS1 of the first fuel injection $I_1$ is calculated from the map shown in FIG. 8A. Next, at step 108, the injection completion timing θE1 of the first fuel injection $I_1$ is calculated based on the injection amount Q1 and the injection start timing θS1. Next, at step 109, the injection amount Q2 (=Q-Q1) of the second fuel injection $I_2$ is calculated. Next, at step 110, the injection start timing θS2 of the second fuel injection $I_2$ is calculated from the map shown in FIG. 8B. Next, at step 111, the injection completion timing θE2 of the second fuel injection $I_2$ is calculated based on the injection amount Q2 and the injection start timing θS2.

Figure 12:
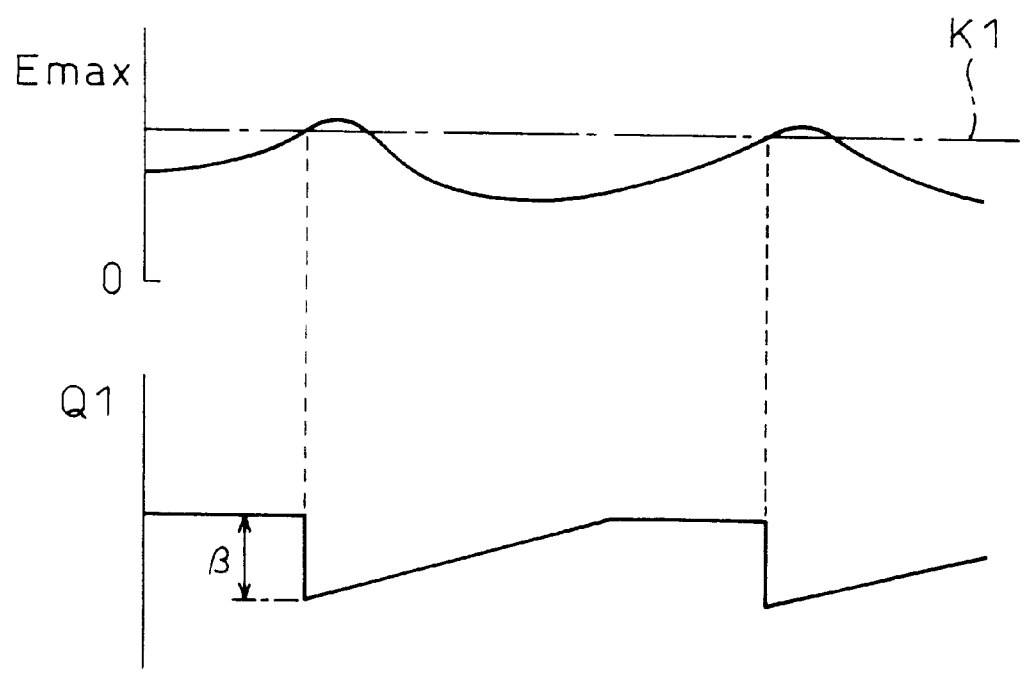
FIG. 12 is a view of changes in a maximum output voltage Emax of the knocking sensor and an injection amount Q1.

FIG. 12 shows a second embodiment. In this embodiment, as shown in FIG. 12, when the maximum output voltage Emax of the knocking sensor 26 exceeds a predetermined upper limit K1, the first injection amount Q1 is rapidly reduced by a predetermined value β, then the first injection amount Q1 is gradually increased.

Figure 13:
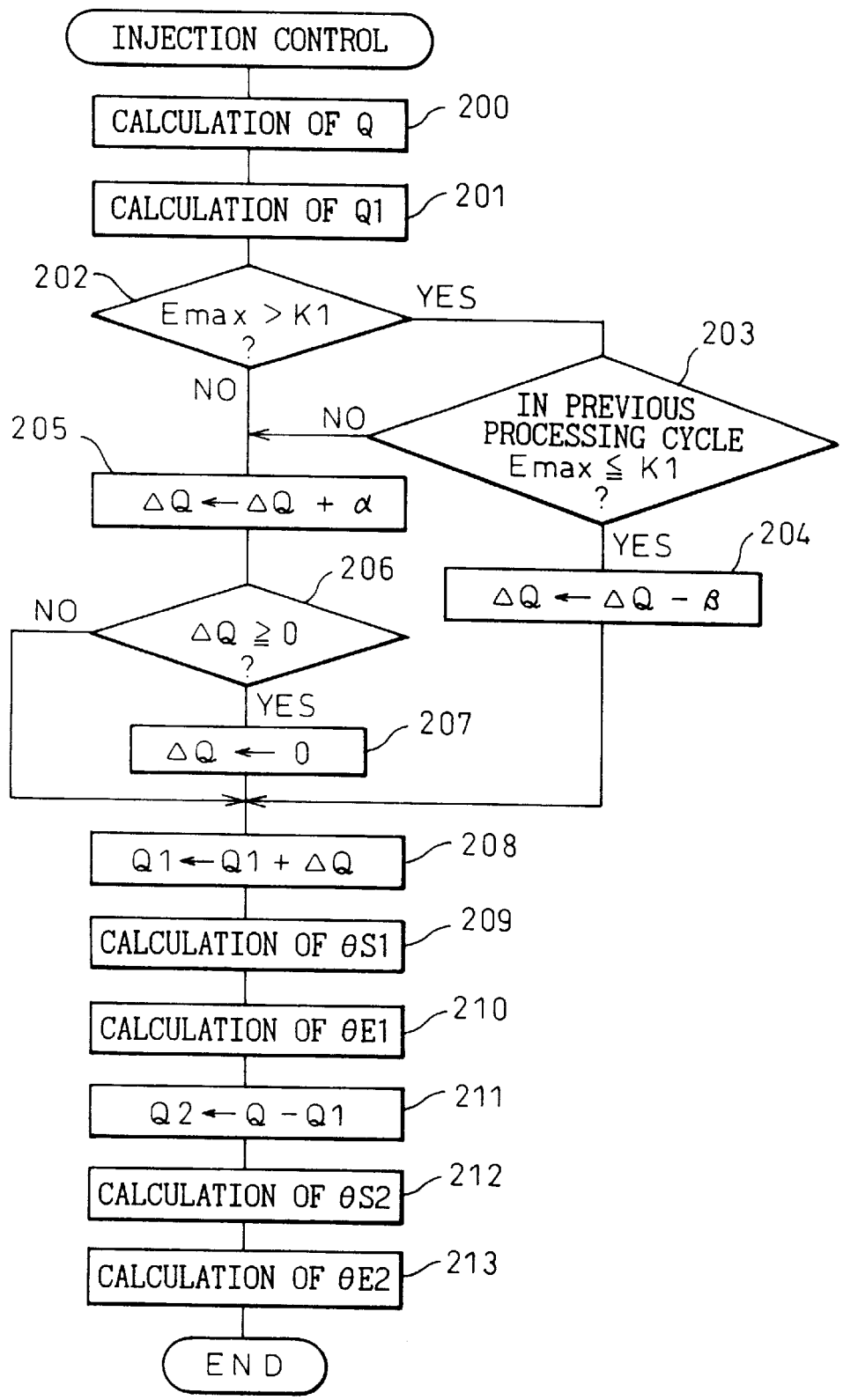
FIG. 13 is a flow chart of the control of injection for working a second embodiment.

FIG. 13 shows an injection control routine for working the second embodiment.

Referring to FIG. 13, first, at step 200, the total amount of fuel injection Q is calculated from the map shown in FIG. 7A. Next, at step 201, the injection amount Q1 of the first fuel injection $I_1$ is calculated from the map shown in FIG. 7B. Next, at step 202, it is judged if the maximum output voltage Emax of the knocking sensor 26 is larger than the upper limit K1 or not. When Emax>K1, the routine proceeds to step 203, where it is judged if Emax≦K1 at the time of the previous processing cycle or not, that is, whether Emax became greater than K1 in the interval from the previous processing cycle to the current processing cycle.

When Emax became greater than K1 in the interval from the previous processing cycle to the current processing cycle, the routine proceeds to step 204, where the correction value ΔQ of the injection amount Q1 is reduced by a predetermined value β, then the routine proceeds to step 208. On the other hand, when it is judged at step 202 that Emax≦K1 or it is judged at step 203 that Emax≦K1 at the previous processing cycle, the routine proceeds to step 205, where the correction value ΔQ is increased by the predetermined value α (α<β), then the routine proceeds to step 206. At step 206, it is judged if the correction value ΔQ is larger than zero or not. When ΔQ≧0, the routine proceeds to step 207, where ΔQ is made zero, then the routine proceeds to step 208.

At step 208, the correction value ΔQ is added to the injection amount Q1. Therefore, it will be understood that when Emax>K1, the injection amount Q1 is rapidly reduced by the predetermined value β, then the injection amount Q1 is gradually increased.

Next, at step 209, the injection start timing θS1 of the first fuel injection $I_1$ is calculated from the map shown in FIG. 8A. Next, at step 210, the injection completion timing θE1 of the first fuel injection $I_1$ is calculated based on the injection amount Q1 and the injection start timing θS1. Next, at step 211, the injection amount Q2 (=Q-Q1) of the second fuel injection $I_2$ is calculated. Next, at step 212, the injection start timing θS2 of the second fuel injection $I_2$ is calculated from the map shown in FIG. 8B. Next, at step 213, the injection completion timing θE2 of the second fuel injection $I_2$ is calculated based on the injection amount Q2 and the injection start timing θS2.

Figure 14:
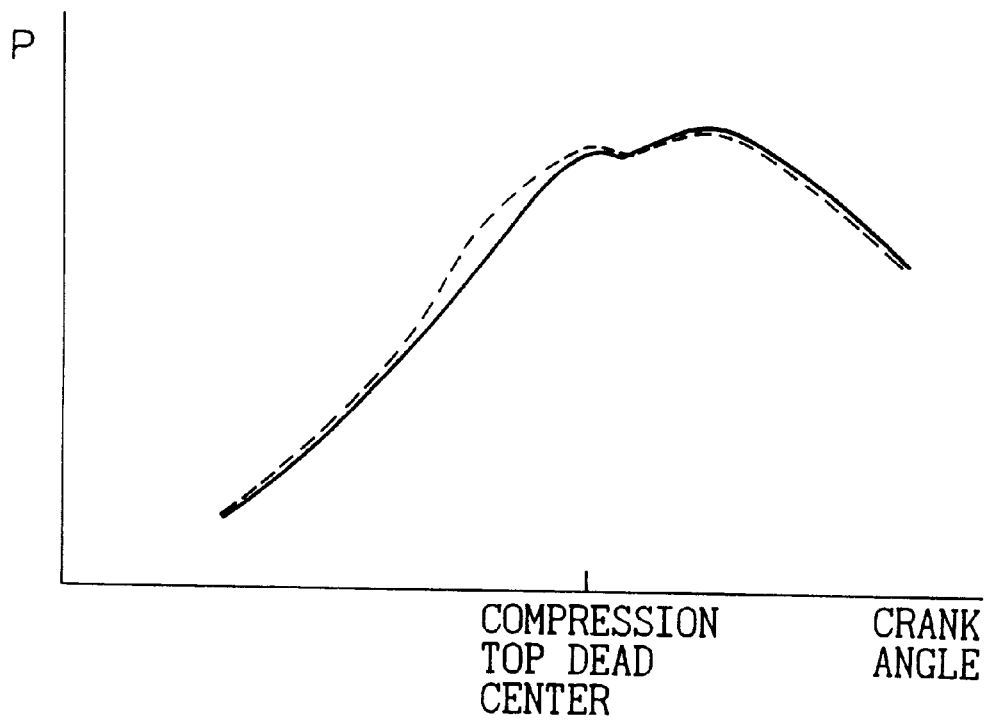
FIG. 14 is a view of the change in pressure in a combustion chamber.

FIG. 14 shows a third embodiment. In this embodiment, the pressure P in the combustion chamber 5 detected by the combustion pressure sensor 25 is used to calculate a heat generation rate $dQ/d\theta$ and this heat generation rate $dQ/d\theta$ is in turn used to control the injection amount Q. That is, in FIG. 14, the solid line shows the change in the pressure P in the combustion chamber 5 when the first injected fuel will not burn on its own, while the broken line in FIG. 14 shows the change in the pressure P in the combustion chamber 5 when the first injected fuel burns a little. The change in the pressure P when the first injected fuel will not burn on its own is stored in advance and the heat generation rate $dQ/d\theta$ is found from the difference of this pressure P and the actually detected pressure P.

When the heat generation rate $dQ/d\theta$ increases, explosive combustion occurs when the heat generation rate $dQ/d\theta$ exceeds a certain limit. Here, in the third embodiment, when the heat generation rate $dQ/d\theta$ exceeds a predetermined upper limit KK1, the first injection amount Q1 is made to gradually be reduced so as to prevent explosive combustion. Further, when the heat generation rate $dQ/d\theta$ becomes small, the amount of the oxygen-containing easily burnable hydrocarbons produced then becomes insufficient and therefore the danger arises of the second injected fuel explosively burning. Therefore, in the third embodiment, when the heat generation rate $dQ/d\theta$ becomes lower than a lower limit KK2, the first injection amount Q1 is made to gradually increase.

Figure 15:
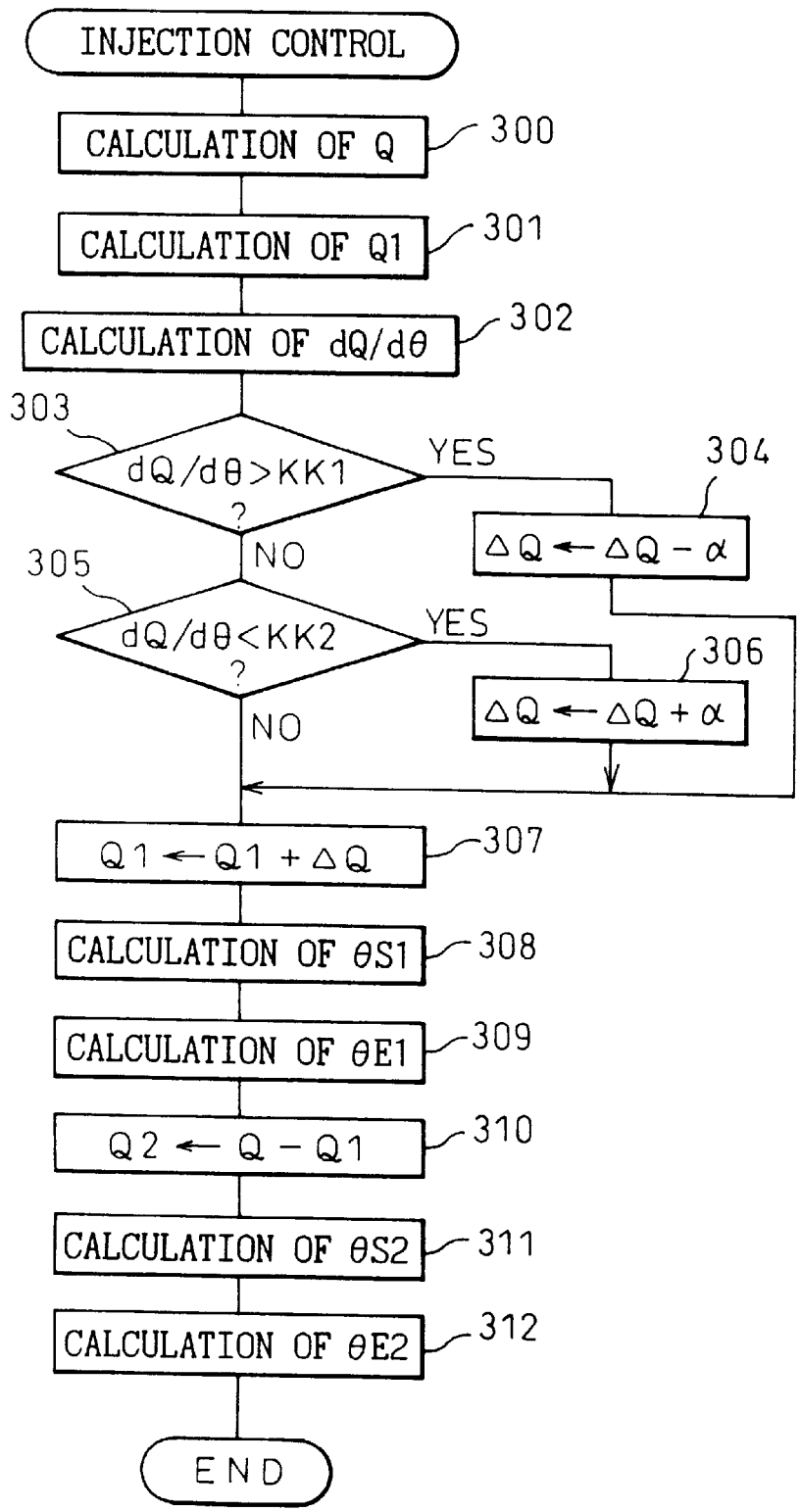
FIG. 15 is a flow chart of the control of injection for working a third embodiment.

FIG. 15 shows an injection control routine for working the third embodiment.

Referring to FIG. 15, first, at step 300, the total amount of fuel injection Q is calculated from the map shown in FIG. 7A. Next, at step 301, the injection amount Q1 of the first fuel injection $I_1$ is calculated from the map shown in FIG. 7B. Next, at step 302, the heat generation rate $dQ/d\theta$ is calculated from the output signal of the combustion pressure sensor 25. Next, at step 303, it is judged if the heat generation rate $dQ/d\theta$ is larger than the upper limit KK1 or not. When $dQ/d\theta > KK1$, the routine proceeds to step 304, where the correction value $\Delta Q$ of the injection amount Q1 is reduced by a predetermined value $\alpha$, then the routine proceeds to step 307. On the other hand, when $dQ/d\theta \leq KK1$, the routine proceeds to step 305, where it is judged if the heat generation rate $dQ/d\theta$ is lower than the lower limit KK2 or not. When $dQ/d\theta < KK2$, the routine proceeds to step 306, where the correction value $\Delta Q$ is increased by the predetermined value $\alpha$, then the routine proceeds to step 307.

At step 307, the correction value $\Delta Q$ is added to the injection amount Q1. Therefore, it will be understood that when $dQ/d\theta > KK1$, the injection amount Q1 is gradually reduced, while when $dQ/d\theta < KK2$, the injection amount Q1 is gradually increased.

Next, at step 308, the injection start timing $\theta S1$ of the first fuel injection $I_1$ is calculated from the map shown in FIG. 8A. Next, at step 309, the injection completion timing $\theta E1$ of the first fuel injection $I_1$ is calculated based on the injection amount Q1 and the injection start timing $\theta S1$. Next, at step 310, the injection amount Q2 (=Q−Q1) of the second fuel injection $I_2$ is calculated. Next, at step 311, the injection start timing $\theta S2$ of the second fuel injection $I_2$ is calculated from the map shown in FIG. 8B. Next, at step 312, the injection completion timing $\theta E2$ of the second fuel injection $I_2$ is calculated based on the injection amount Q2 and the injection start timing $\theta S2$.

Figure 16:
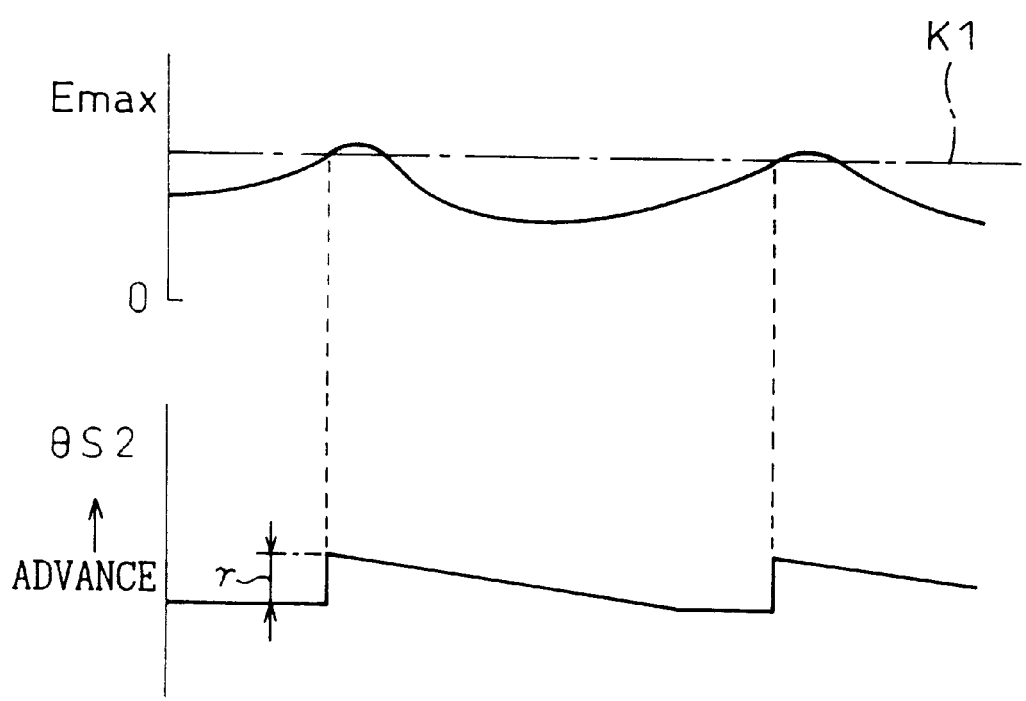
FIG. 16 is a view of changes in a maximum output voltage Emax of the knocking sensor and an injection start timing $\theta S2$.

FIG. 16 shows a fourth embodiment. In this embodiment, the injection start timing $\theta S2$ of the second fuel injection $I_2$ is controlled based on the maximum voltage Emax of the knocking sensor 26. That is, if the first injected fuel starts to burn near top dead center of the compression stroke before the second fuel injection $I_2$, the intensity of the engine vibration will become higher. In this case, if the injection start timing $\theta S2$ of the second fuel injection $I_2$ is advanced, the first injected fuel will not burn until the second fuel injection $I_2$ and the first injected fuel and second injected fuel can be burned after the second fuel injection $I_2$.

Therefore, in the fourth embodiment, as shown in FIG. 16, when the maximum output voltage Emax of the knocking sensor 26 exceeds the upper limit K1, the injection start timing $\theta S2$ of the second fuel injection $I_2$ is rapidly advanced by the predetermined value $\gamma$, then the injection start timing $\theta S2$ is gradually retarded.

Figure 17:
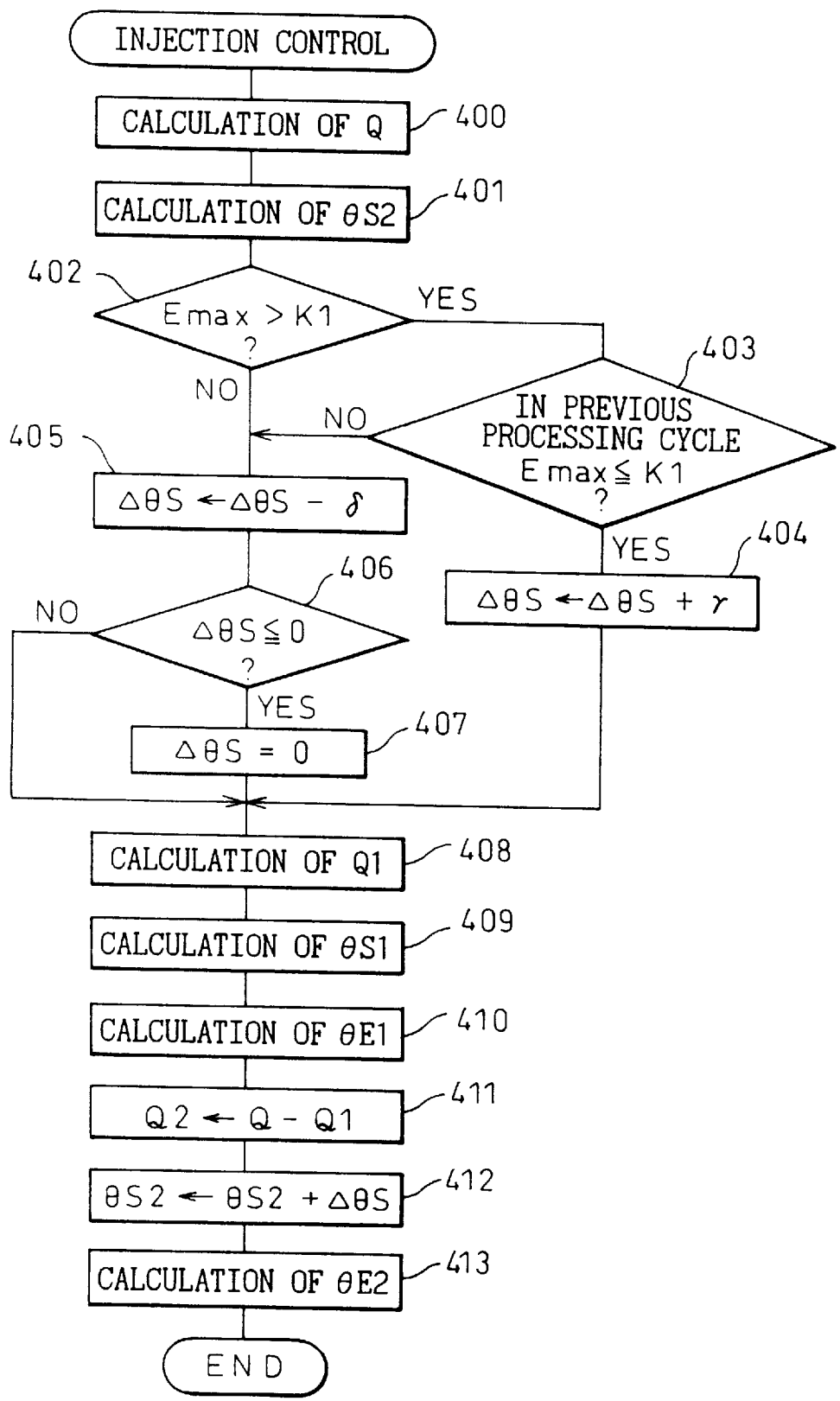
FIG. 17 is a flow chart of the control of injection for working a fourth embodiment.

FIG. 17 shows an injection control routine for working the fourth embodiment.

Referring to FIG. 17, first, at step 400, the total amount of fuel injection Q is calculated from the map shown in FIG. 7A. Next, at step 401, the injection amount Q1 of the first fuel injection $I_1$ is calculated from the map shown in FIG. 8B. Next, at step 402, it is judged if the maximum output voltage Emax of the knocking sensor 26 is larger than the upper limit K1 or not. When Emax>K1, the routine proceeds to step 403, where it is judged if Emax≦K1 at the time of the previous processing cycle or not, that is, whether Emax became greater than K1 in the interval from the previous processing cycle to the current processing cycle.

When Emax became greater than K1 in the interval from the previous processing cycle to the current processing cycle, the routine proceeds to step 404, where the correction value $\Delta \theta S$ of the injection start timing $\theta S2$ is advanced by a predetermined value $\gamma$, then the routine proceeds to step 408. On the other hand, when it is judged at step 402 that Emax≦K1 or it is judged at step 403 that Emax≦K1 at the previous processing cycle, the routine proceeds to step 405, where the correction value $\Delta \theta S$ is reduced by the predetermined value $\delta$ ($\delta < \gamma$), then the routine proceeds to step 406.

At step 406, it is judged if the correction value $\Delta \theta S$ is smaller than zero or not. When $\Delta \theta S \leq 0$, the routine proceeds to step 407, where $\Delta \theta S$ is made zero, then the routine proceeds to step 408.

At step 408, the injection amount Q1 of the first fuel injection $I_1$ is calculated from the map shown in FIG. 7B. Next, at step 409, the injection start timing $\theta S1$ of the first fuel injection $I_1$ is calculated from the map shown in FIG. 8A. Next, at step 410, the injection completion timing $\theta E1$ of the first fuel injection $I_1$ is calculated based on the injection amount Q1 and the injection start timing $\theta S1$. Next, at step 411, the injection amount Q2 (=Q−Q1) of the second fuel injection $I_2$ is calculated.

Next, at step 412, the correction value $\Delta \theta S$ is added to the injection start timing $\theta S2$. Therefore, it will be understood that when Emax>K1, the injection start timing $\theta S2$ is rapidly advanced, then the injection start timing $\theta S2$ is gradually retarded. Next, at step 413, the injection completion timing $\theta E2$ of the second fuel injection $I_2$ is calculated based on the injection amount Q2 and the injection start timing $\theta S2$.

Next, a fifth embodiment will be explained. As explained above, if the fuel is injected in the injection timing region III, almost no NOx or soot will be produced. The amount of NOx and soot produced becomes smaller when injecting fuel in the injection timing region III compared with when injecting it in the injection timing region II, then injecting fuel at the substantially top dead center of the compression stroke or after the top dead center of the compression stroke. Therefore, it is preferable to inject fuel in the injection timing region III as much as possible. As explained above, however, almost no NOx or soot is produced any longer when injecting fuel in the injection timing region III when the fuel injection amount is not more than about 50 percent of the maximum injection amount.

Figure 18:
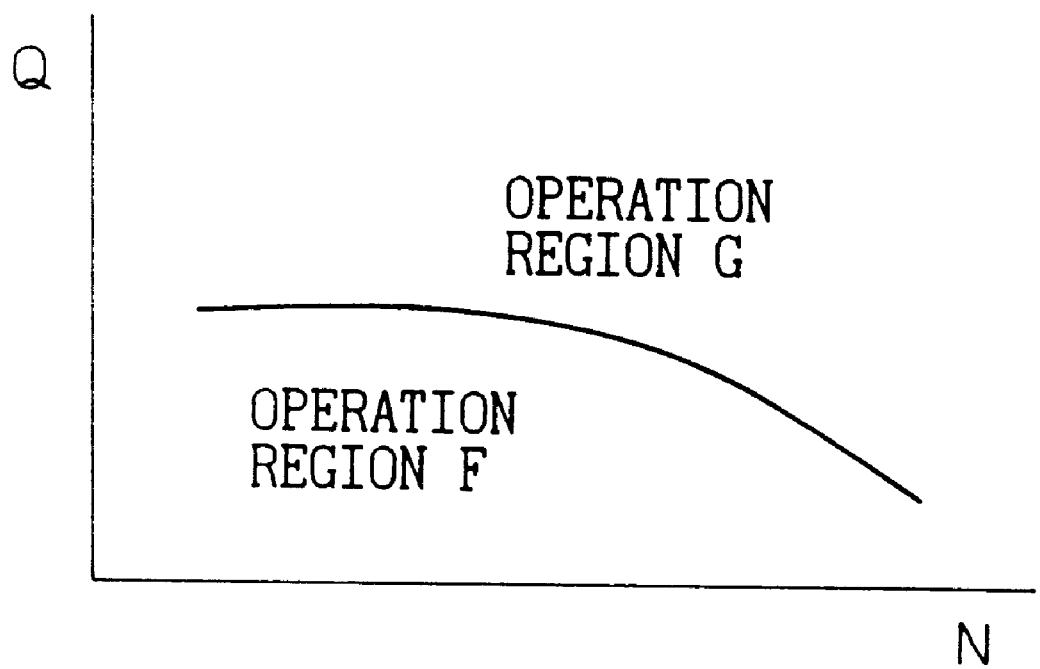
FIG. 18 is a view of operating regions of an engine.

Therefore, in the fifth embodiment, as shown in FIG. 18, the engine operating region is divided into a low load side first operating region F and a high load side second operating region G, fuel is injected at least once in the injection timing region III when the engine is operating in the operating region F, and first fuel of not more than 30 percent of the maximum injection amount is injected in the injection timing region II and then second fuel is injected at about top dead center of the compression stroke or after top dead center of the compression stroke when the engine is operating in the operating region G. Note that in FIG. 18, the ordinate Q indicates the total amount of fuel injection, while the abscissa N indicates the engine rotational speed.

FIG. 19A shows the injection timings of the fuel injection I in the operating region F at a specific engine rotational speed N, for example, 1500 rpm, and the first fuel injection $I_1$ and second fuel injection $I_2$ in the operating region G, while FIG. 19B shows the injection timing of the first fuel injection $I_1$ in the operating region G. Note that the abscissa Q of FIG. 19A shows the total amount of fuel injection, while the abscissa N of FIG. 19B shows the engine rotational speed.

Further, in FIGS. 19A and 19B, the $\theta S$ and $\theta E$ in the operating region F show the injection start timing and injection completion timing of the fuel injection I, the $\theta S1$ and $\theta E1$ in the operating region G show the injection start timing and injection completion timing of the first fuel injection $I_1$, and the $\theta S2$ and $\theta E2$ in the operating region G show the injection start timing and injection completion timing of the second fuel injection $I_2$.

Note that as shown in FIG. 19A, in the fifth embodiment, the injection completion timing $\theta E$ of the fuel injection I is fixed to about 70 degrees before top dead center (BTDC) of the compression stroke, therefore, in this embodiment, fuel is injected once near BTDC 70 degrees. Of course, in this case, it is also possible to perform the fuel injection I split into two.

In the fifth embodiment, the first injection amount Q1 is controlled based on the maximum output Emax of the knocking sensor 26 when the engine is operating in the operating region G.

Figure 20:
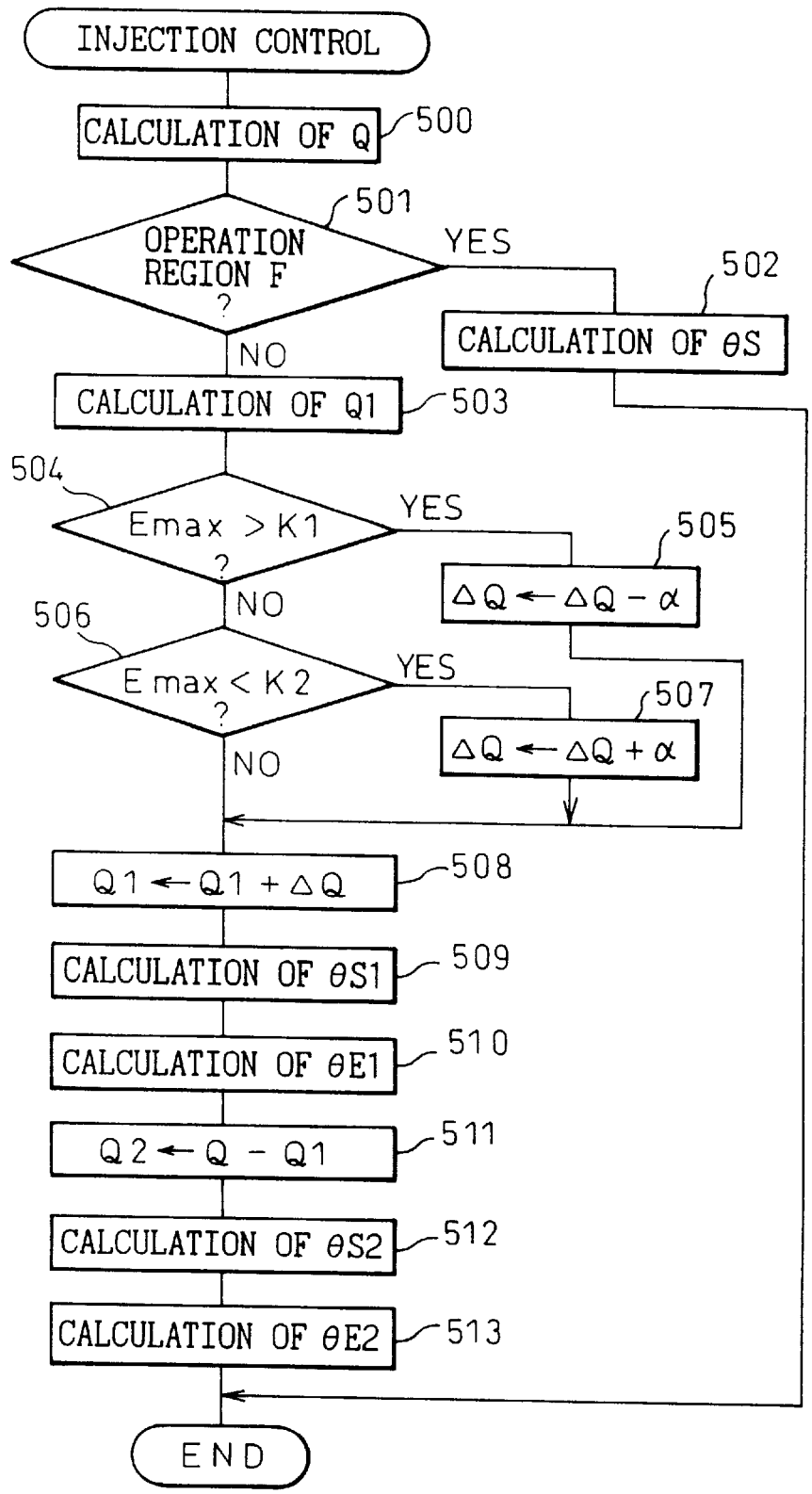
FIG. 20 is a flow chart of the control of injection for working a fifth embodiment.

FIG. 20 shows an injection control routine for working the fifth embodiment.

Referring to FIG. 20, first, at step 500, the total amount of fuel injection Q is calculated from the map shown in FIG. 7A. Next, at step 501, it is judged if the engine is operating in the operating region F of FIG. 18 or not. When the engine is operating in the operating region F, the routine proceeds to step 502, where the injection start timing θS of the fuel injection I is calculated based on the total amount of fuel injection Q etc. As opposed to this, when the engine is not operating in the operating region F, that is when it is operating in the operating region G, the routine proceeds to step 503, where the injection amount Q1 of the first fuel injection $I_1$ is calculated from the map shown in FIG. 7B. Next, at step 504, it is judged if the maximum output voltage Emax of the knocking sensor 26 is larger than the upper limit K1 or not. When Emax>K1, the routine proceeds to step 505, where the correction value ΔQ of the injection amount Q is reduced by a predetermined value α, then the routine proceeds to step 508. On the other hand, when Emax≦K1, the routine proceeds to step 506, where it is judged if the maximum output voltage Emax of the knocking sensor 26 is lower than the lower limit K2 or not. When Emax<K2, the routine proceeds to step 507, where the correction value ΔQ is increased by the predetermined value α, then the routine proceeds to step 508.

At step 508, the correction value ΔQ is added to the injection amount Q1. Therefore, it will be understood that when Emax>K1 when the engine is operating in the operating region G, the injection amount Q1 is gradually reduced, while when Emax<K2, the injection amount Q1 is gradually increased.

Next, at step 509, the injection start timing θS1 of the first fuel injection $I_1$ is calculated from the map shown in FIG. 8A. Next, at step 510, the injection completion timing θE1 of the first fuel injection $I_1$ is calculated based on the injection amount Q1 and the injection start timing θS1. Next, at step 511, the injection amount Q2 (=Q−Q1) of the second fuel injection $I_2$ is calculated. Next, at step 512, the injection start timing θS2 of the second fuel injection $I_2$ is calculated from the map shown in FIG. 8B. Next, at step 513, the injection completion timing θE2 of the second fuel injection $I_2$ is calculated based on the injection amount Q2 and the injection start timing θS2.

Note that while the explanation given up to here was made with reference to the case of control of the first injection amount or the injection timing of the second fuel injection, it is also possible to control the injection timing of the first fuel injection or the second injection amount.

According to the present invention, as mentioned above, it is possible to suppress the generation of NOx and soot over the entire operating region of the engine by controlling the amounts of injection or injection timings so give gentle combustion.

While the invention has been described with reference to specific embodiments chosen for purposes of illustration, it should be apparent that numerous modifications could be made thereto by those skilled in the art without departing from the basic concept and scope of the invention.

What is claimed is:

1. A compression-ignition type engine, comprising:
    a combustion chamber;
    a fuel injector injecting fuel toward the combustion chamber;
    injecting means for injecting first fuel in a predetermined injection timing region of a latter half of a compression stroke and injecting second fuel at a timing later than the predetermined injection timing region, wherein the predetermined injection timing region is from about 90 degrees before top dead center of the compression stroke to about 20 degrees before top dead center of the compression stroke;
    detecting means for detecting a reaction state of the first injected fuel; and
    control means for controlling at least one of an injection amount or injection timing of a first fuel injection or an injection amount or injection timing of a second fuel injection based on the result of detection of said detecting means so that the first injected fuel does not burn before the second fuel injection.

2. A compression-ignition type engine as set forth in claim 1, wherein said detecting means detects the reaction state of the first injected fuel from an intensity of vibration of the engine and said control means causes the injection amount of the first fuel injection to be reduced when the intensity of vibration of the engine exceeds a predetermined intensity.

3. A compression-ignition type engine as set forth in claim 2, wherein said control means causes the injection amount of the first fuel injection to be rapidly reduced and then causes the injection amount of the first fuel injection to gradually increase when the intensity of vibration of the engine exceeds a predetermined intensity.

4. A compression-ignition type engine as set forth in claim 1, wherein said detecting means detects the reaction state of the first injected fuel from an intensity of vibration of the engine and said control means causes the injection amount of the first fuel injection to be reduced when the intensity of vibration of the engine exceeds a predetermined upper limit and causes the injection amount of the first fuel injection to be increased when the intensity of vibration of the engine becomes lower than a predetermined lower limit.

5. A compression-ignition type engine as set forth in claim 1, wherein said detecting means detects the reaction state of the first injected fuel from a heat generation rate of the first injected fuel and said control means causes the injection amount of the first fuel injection to be reduced when the heat generation rate of the first injected fuel exceeds a predetermined heat generation rate.

6. A compression-ignition type engine as set forth in claim 1, wherein said detecting means detects the reaction state of the first injected fuel from a heat generation rate of the first injected fuel and said control means causes the injection amount of the first fuel injection to be reduced when the heat generation rate of the first injected fuel exceeds a predetermined upper limit and causes the injection amount of the first fuel injection to be increased when the heat generation rate of the first injected fuel is lower than a predetermined lower limit.

7. A compression-ignition type engine as set forth in claim 1, wherein said detecting means detects the reaction state of the first injected fuel from a heat generation rate of the first injected fuel and said control means advances the injection timing of the second fuel injection when the heat generation rate of the first injected fuel exceeds a predetermined heat generation rate.

8. A compression-ignition type engine as set forth in claim 1, wherein the injection amount of the first fuel injection is not more than 30 percent of the maximum injection amount.

9. A compression-ignition type engine as set forth in claim 1, wherein the earliest injection timing in the predetermined injection timing region shifts to the bottom dead center of the compression stroke side the higher the engine rotational speed and the latest injection timing in the predetermined injection timing region also shifts to the bottom dead center of the compression stroke side the higher the engine rotational speed.

10. A compression-ignition type engine as set forth in claim 9, wherein the earliest injection timing is near 50 degrees before top dead center of the compression stroke when the engine speed is 600 rpm and near 90 degrees before top dead center of the compression stroke when the engine speed is 4000 rpm.

11. A compression-ignition type engine as set forth in claim 9, wherein the latest injection timing shifts toward the bottom dead center of the compression stroke the larger the ratio of the amount of the first fuel injection to the maximum amount of injection and the difference between the earliest injection timing and the latest injection timing at the same engine speed becomes smaller the larger the ratio.

12. A compression-ignition type engine as set forth in claim 11, wherein when the amount of the first fuel injection is 5 percent of the maximum amount of injection and the engine speed is 600 rpm, the latest injection timing is about 20 degrees before top dead center of the compression stroke and the difference in injection timings is from about 30 degrees crank angle to 40 degrees crank angle.

13. A compression-ignition type engine as set forth in claim 11, wherein when the amount of the first fuel injection is 10 percent of the maximum amount of injection and the engine speed is 600 rpm, the latest injection timing is about 30 degrees before top dead center of the compression stroke and the difference in injection timings is from about 20 degrees crank angle to 30 degrees crank angle.

14. A compression-ignition type engine as set forth in claim 11, wherein when the amount of the first fuel injection is 20 percent of the maximum amount of injection and the engine speed is 600 rpm, the latest injection timing is about 40 degrees before top dead center of the compression stroke and the difference in injection timings is from about 10 degrees crank angle to 15 degrees crank angle.

15. A compression-ignition type engine as set forth in claim 1, wherein the first fuel injection timing is made earlier the higher the engine speed.

16. A compression-ignition type engine as set forth in claim 1, wherein the second fuel injection is performed at substantially top dead center of the compression stroke or after top dead center of the compression stroke.

17. A compression-ignition type engine as set forth in claim 1, wherein the engine operating region is divided into a low load side first operating region and a high load side second operating region, said injecting means injects fuel at least once before 50 degrees before top dead center of the compression stroke when the engine is operating in the first operating region, and the injecting means injects first fuel in the predetermined injection timing region and injects second fuel at a timing later than the predetermined injection timing region when the engine is operating in the second operating region.

18. A compression-ignition type engine, comprising:

a combustion chamber;

a fuel injector injecting fuel toward the combustion chamber;

injecting means for injecting first fuel in a predetermined injection timing region of a latter half of a compression stroke and injecting second fuel at a timing later than the predetermined injection timing region;

detecting means for detecting a reaction state of the first injected fuel, from an intensity of vibration of the engine; and control means for controlling at least one of an injection amount or injection timing of a first fuel injection or an injection amount or injection timing of a second fuel injection based on the result of detection of said detecting means so that the first injected fuel does not burn before the second fuel injection, and the injection timing of the second fuel injection is advanced when the intensity of the vibration of the engine exceeds a predetermined intensity.

19. A compression-ignition type engine as set forth in claim 18, wherein said control means rapidly advances the injection timing of the second fuel injection by a predetermined crank angle and then gradually retards the injection timing of the second fuel injection when the intensity of vibration of the engine exceeds a predetermined intensity.

* * * * *